(12) United States Patent
Sato et al.

(10) Patent No.: US 7,311,333 B2
(45) Date of Patent: Dec. 25, 2007

(54) VEHICLE SHOCK ABSORPTION TYPE STEERING COLUMN DEVICE

(75) Inventors: Kenji Sato, Gunma-ken (JP); Naoki Sawada, Gunma-ken (JP)

(73) Assignee: NSK, Ltd., Tokyo (JP)

( * ) Notice: Subject to any disclaimer, the term of this patent is extended or adjusted under 35 U.S.C. 154(b) by 342 days.

(21) Appl. No.: 10/520,182

(22) PCT Filed: Jul. 9, 2003

(86) PCT No.: PCT/JP03/08709

§ 371 (c)(1),
(2), (4) Date: Jan. 5, 2005

(87) PCT Pub. No.: WO2004/007261

PCT Pub. Date: Jan. 22, 2004

(65) Prior Publication Data

US 2005/0167962 A1    Aug. 4, 2005

(30) Foreign Application Priority Data

| Jul. 10, 2002 | (JP) | ............................. 2002-201511 |
| Sep. 18, 2002 | (JP) | ............................. 2002-271047 |
| May 23, 2003 | (JP) | ............................. 2003-146697 |
| May 23, 2003 | (JP) | ............................. 2003-146710 |

(51) Int. Cl.
*B62D 1/11* (2006.01)

(52) U.S. Cl. ...................... 280/777; 280/775; 280/779; 74/493

(58) Field of Classification Search ................ 280/777, 280/775, 779, 780; 74/492; 188/371, 374
See application file for complete search history.

(56) References Cited

U.S. PATENT DOCUMENTS

| 4,733,575 | A | * | 3/1988 | Nakamura .................... 74/493 |
| 5,857,703 | A | * | 1/1999 | Kinoshita et al. ........... 280/775 |
| 5,875,686 | A | * | 3/1999 | Kinoshita et al. ............. 74/492 |
| 6,345,842 | B1 | * | 2/2002 | Igarashi et al. ............. 280/775 |
| 6,378,903 | B1 | * | 4/2002 | Yabutsuka et al. .......... 280/777 |
| 6,467,807 | B2 | * | 10/2002 | Ikeda et al. ................. 280/775 |
| 6,631,924 | B2 | * | 10/2003 | Nomura et al. ............. 280/777 |
| 7,125,046 | B2 | * | 10/2006 | Sawada et al. ............. 280/777 |
| 7,134,692 | B2 | * | 11/2006 | Yamamura ................... 280/777 |
| 2002/0167157 | A1 | * | 11/2002 | Matsumoto et al. ........ 280/777 |
| 2005/0268739 | A1 | * | 12/2005 | Sato et al. .................... 74/492 |

FOREIGN PATENT DOCUMENTS

| JP | U.M. 53-33133 | 3/1978 |
| JP | 7-47961 | 2/1995 |
| JP | 8-67257 | 3/1996 |

(Continued)

*Primary Examiner*—Paul N. Dickson
*Assistant Examiner*—Drew J. Brown
(74) *Attorney, Agent, or Firm*—Miles & Stockbridge P.C.

(57) ABSTRACT

An impact absorbing type steering column apparatus for an automotive vehicle is capable of adjusting a steering position and, when a secondary collision happens, absorbs impact energy thereof by moving a steering column supported through a bracket on a car body towards the front of the vehicle. The bracket includes a restricting portion for restricting a steering position adjusting range of the steering column. The restricting portion allows, upon the secondary collision, the steering column to move beyond the steering position adjusting range.

20 Claims, 24 Drawing Sheets

FOREIGN PATENT DOCUMENTS

| | | |
|---|---|---|
| JP | 8-175401 | 7/1996 |
| JP | 11-129915 | 5/1999 |
| JP | 2978788 | 9/1999 |
| JP | 2000-229577 | 8/2000 |
| JP | 2001-233223 | 8/2001 |
| JP | 2002-59853 | 2/2002 |

* cited by examiner

VEHICLE SHOCK ABSORPTION TYPE STEERING COLUMN DEVICE

TECHNICAL FIELD

The present invention relates to an impact absorbing type steering column apparatus for an automotive vehicle.

BACKGROUND ARTS

In case an automotive vehicle gets collided, there is a possibility in which a driver might encounter a secondary collision with a steering wheel due to inertia thereof. An impact absorbing type steering column apparatus is adopted in order to protect the driver on that occasion. A steering column is constructed so that an energy absorbing member, just when the driver secondarily collides with the steering wheel, gets collapsed while moving along a car body together with a steering shaft, and the steering column moves towards the front of the vehicle, thereby absorbing the impact energy thereof.

Given by way of one example of the impact absorbing type steering column apparatus is an impact energy absorbing system, wherein when the secondary collision happens, as disclosed in Japanese Patent Publication No. 2978788 and Japanese Patent Application Laid-Open No. 2000-229577, the impact energy is absorbed by causing flexural deformations of car body sided brackets (a tilt bracket and a lower bracket) through which the steering column is attached to the car body.

By the way, as in the case of Japanese Patent Publication No. 2978788, upon the secondary collision, the tilt bracket gets deformed in flexure towards the front of the vehicle by dint of impact energy thereof. Then, a tilt fastening bolt gets displaced along a tilt adjusting groove and reaches a lowest position of this tilt adjusting groove, in which case this implies an arrival at a terminal of a collapse stroke of the energy absorbing member, and the steering column stops its collapsing movement.

Further, also as in the case of Japanese Patent Application Laid-Open No. 2000-229577, if the lower bracket makes a predetermined amount of its flexural deformation towards the front of the vehicle when the secondary collision occurs, it follows that the steering column reaches the terminal of its collapsing movement and stops its collapsing movement.

Thus, a normal operation of the steering column is that the steering column, generally when reaching the normally-set terminal of the collapsing movement, stops and makes no further collapsing movement.

Moreover, there exists a demand for properly adjusting a moving range of the steering column against the secondary collision, corresponding to a type and a shipping destination of the automotive vehicle.

DISCLOSURE OF THE INVENTION

It is an object of the present invention, which was devised under such circumstances, to provide an impact absorbing type steering column apparatus for an automotive vehicle that is capable of gaining a more extension of a moving range of a steering column against a secondary collision.

To accomplish the above object, according to a first invention, in an impact absorbing type steering column apparatus for an automotive vehicle, capable of adjusting a steering position and, when a secondary collision happens, absorbing impact energy thereof by moving a steering column supported through a bracket on a car body towards the front of the vehicle, there is provided an improvement characterized in that the bracket includes a restricting portion for restricting a steering position adjusting range of the steering column, and the restricting portion allows, upon the secondary collision, the steering column to move beyond the steering position adjusting range.

According to the present invention, when the secondary collision happens, the steering column is capable of absorbing energy thereof while moving without being restricted within a range of the steering column position adjusting groove.

According to a second invention, in an impact absorbing type steering column apparatus for an automotive vehicle, capable of adjusting a steering position and, when a secondary collision happens, absorbing impact energy thereof by moving a steering column supported through a bracket on a car body towards the front of the vehicle, there is provided an improvement characterized in that the bracket includes a steering column position adjusting groove, through which a fastening member of the steering column is inserted and of which one end is opened, and a restricting portion for restricting a steering position adjusting range of the steering column, and the restricting portion allows, upon the secondary collision, the steering column to move beyond the steering position adjusting range.

According to the second invention, in the impact absorbing type steering column apparatus for the automotive vehicle, preferably, the groove serves for adjusting a tilt position of the steering column, and a lower bracket supporting the steering column through a hinge mechanism in front of the vehicle and supported on the car body, is provided on a front-of-the vehicle side of the bracket, the lower bracket is provided with a cut-away portion through which a pivot of the hinge mechanism is inserted and of which a front-of-the-vehicle side is opened, and the pivot comes off the open side end of the cut-away portion by dint of a force acting in an axial direction of the steering column when the secondary collision happens, and the steering column is released from the lower bracket.

In the thus constructed impact absorbing type steering column apparatus, the pivot comes off the cut-away portion of the lower bracket by dint of the force acting in the axial direction, thereby enabling the steering column to get displaced without any restriction and enabling a collapse stroke to gain its further extension.

According to a third invention, in an impact absorbing type steering column apparatus for an automotive vehicle, capable of adjusting a steering position and, when a secondary collision happens, absorbing impact energy thereof by moving a steering column supported through a bracket on a car body towards the front of the vehicle, there is provided an improvement characterized in that there is provided a restricting member including a first restricting portion and a second restricting portion, the restricting member allows, within the first restricting portion, the steering column to move for a positional adjustment, then deforms when the steering column moves, upon a secondary collision, beyond a first predetermined range restricted by the first restricting portion, and restricts the movement of the steering column within a second predetermined range by use of the second restricting portion.

Thus, according to the third invention, upon the secondary collision, the steering column, when moving up to the terminal of the first predetermined range as restricted by the first restricting portion, makes its further collapsing movement along the second restricting portion beyond the terminal in a way that causes the restricting member to deform.

It is therefore possible to surely meet the demand for the proper adjustment, corresponding to the type and the shipping destination of the automotive vehicle.

According to a first aspect of the third invention, in the impact absorbing type steering column apparatus for the automotive vehicle, it is preferable that the bracket is constructed of an upper bracket and a lower bracket, a bolt is inserted through a hole of the upper bracket, and the steering column is supported by the upper bracket. It is also preferable that the restricting member is formed integrally with the car body sided upper bracket, and the first restricting portion is formed with the hole. It is further preferable that when the steering column moves through only the first predetermined range upon the secondary collision, the bolt causes the restricting member to deform and enters the second restricting portion provided adjacent to the first restricting portion.

According to the first aspect of the third invention, in the impact absorbing type steering column apparatus for the automotive vehicle, preferably, when the bolt enters the second restricting portion, the restricting member makes its flexural deformation so as to extend in a moving direction of the bolt.

According to the first aspect of the third invention, in the impact absorbing type steering column apparatus for the automotive vehicle, preferably, the second restricting portion is previously formed as an elongate hole suitable for guiding the bolt in its moving direction when the bolt has entered the second restricting portion.

According to the first aspect of the third invention, in the impact absorbing type steering column apparatus for the automotive vehicle, preferably, the hole of the upper bracket is a groove for a tilt adjustment, and the bolt is a fastening bolt for the tilt adjustment.

According to a second aspect of the third invention, in the impact absorbing type steering column apparatus for the automotive vehicle, it is preferable that the bracket is constructed of an upper bracket and a lower bracket, a bolt is inserted through a hole of the lower bracket, and the steering column is supported by the lower bracket. It is also preferable that the restricting member is formed integrally with the car body sided lower bracket, and the first restricting portion is formed with the hole. It is further preferable that when the secondary collision happens, impact energy is absorbed in a way that causes a flexural deformation of the restricting member while moving the steering column towards the front of the vehicle, and, when the steering column moves through only the first predetermined range, the bolt causes the restricting member to deform and enters the second restricting portion provided adjacent to the first restricting portion.

According to the second aspect of the third invention, in the impact absorbing type steering column apparatus for the automotive vehicle, it is preferable that when the bolt enters the second restricting portion, the restricting member makes its flexural deformation so as to extend in a moving direction of the bolt.

According to the second aspect of the third invention, in the impact absorbing type steering column apparatus for the automotive vehicle, it is preferable that the second restricting portion is previously formed as an elongate hole suitable for guiding the bolt in its moving direction when the bolt has entered the second restricting portion. According to the second aspect of the third invention, in the impact absorbing type steering column apparatus for the automotive vehicle, it is preferable that the hole of the car body sided lower bracket is a support hole for the tilt adjustment, and the bolt is a tilt adjusting hinge pin for determining a tilt center when inserted into the support hole.

THE EMBODIMENTS OF THE INVENTION

An impact absorbing type steering column apparatus for an automotive vehicle according to an embodiment of the present invention, will hereinafter be described with reference to the drawings.

First Embodiment

Figure 1:
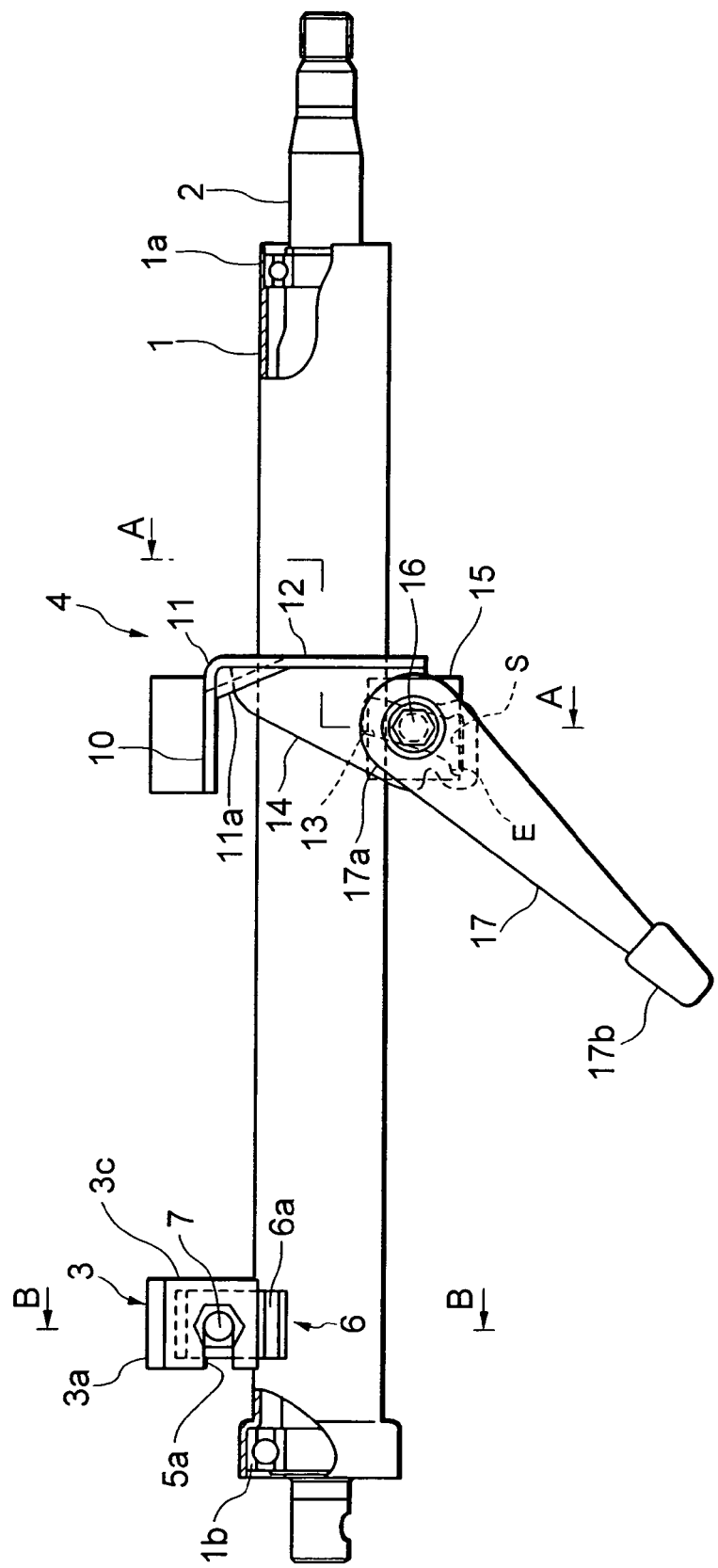
FIG. 1 is a side view of an impact absorbing type steering column apparatus for an automotive vehicle according to a first embodiment of the present invention.
Figure 2:
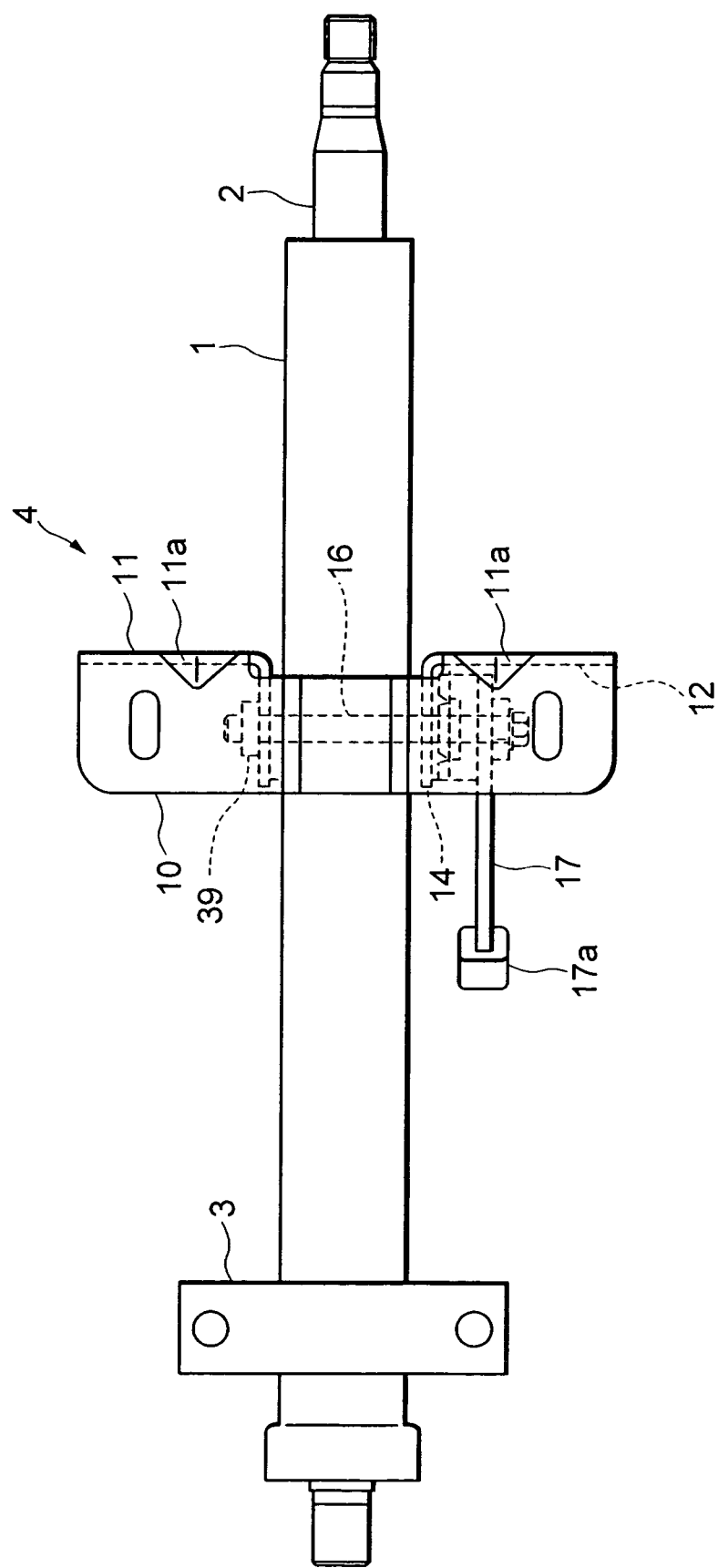
FIG. 2 is a plan view of the impact absorbing type steering column apparatus for the automotive vehicle shown in FIG. 1.
Figure 3:
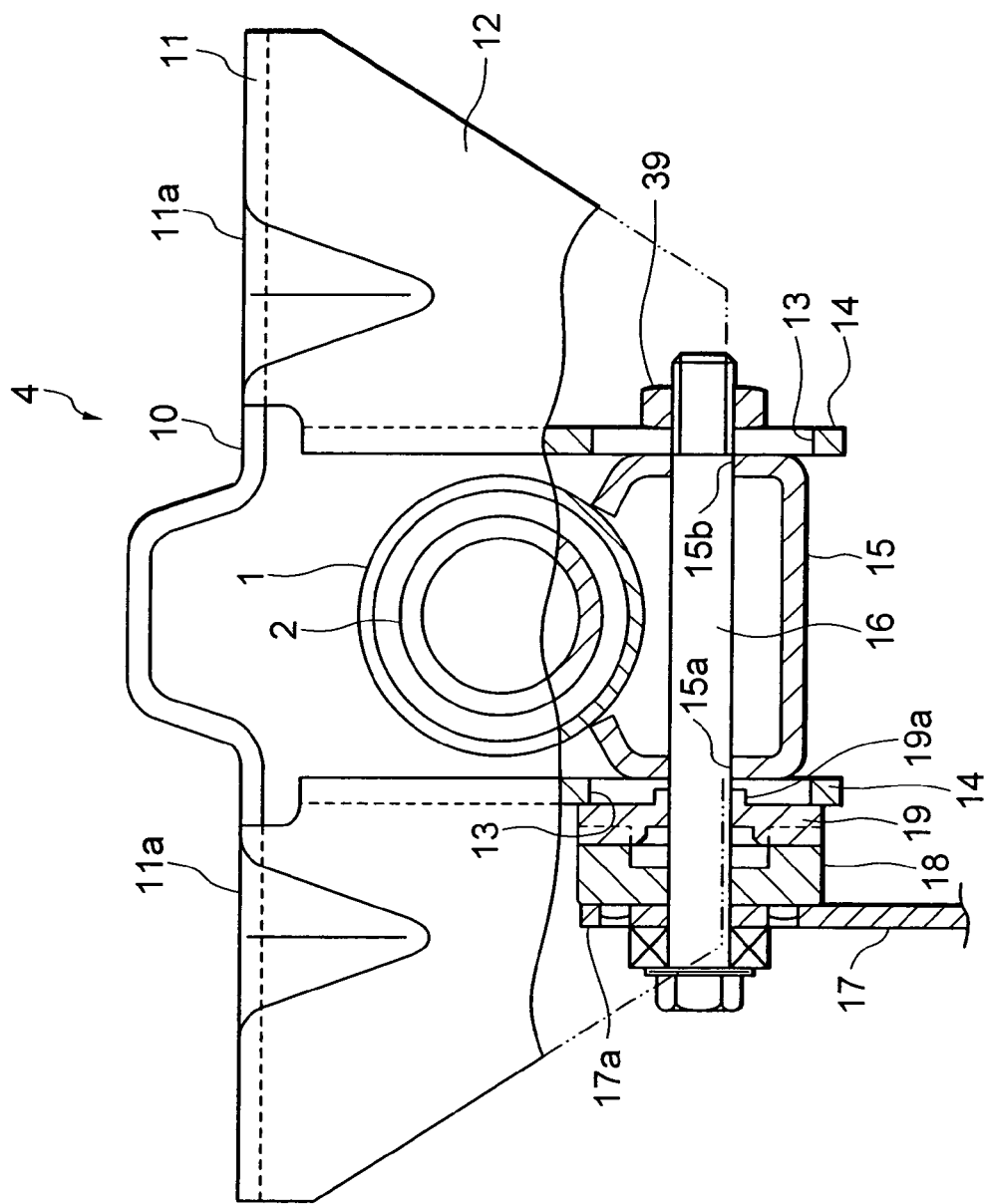
FIG. 3 is a sectional view taken along the line A-A in FIG. 1.
Figure 4:
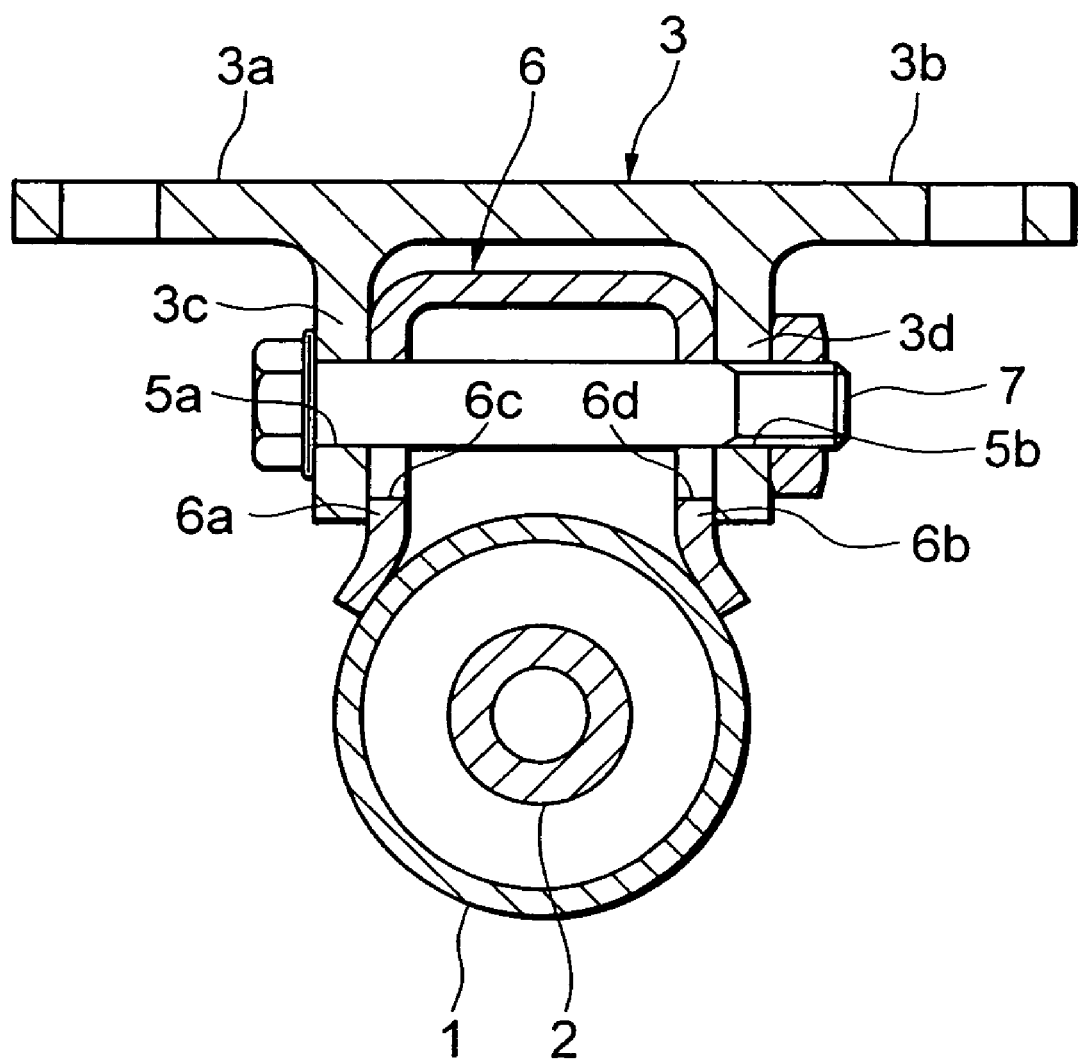
FIG. 4 is a sectional view taken along the line B-B in FIG. 1.
Figure 5:
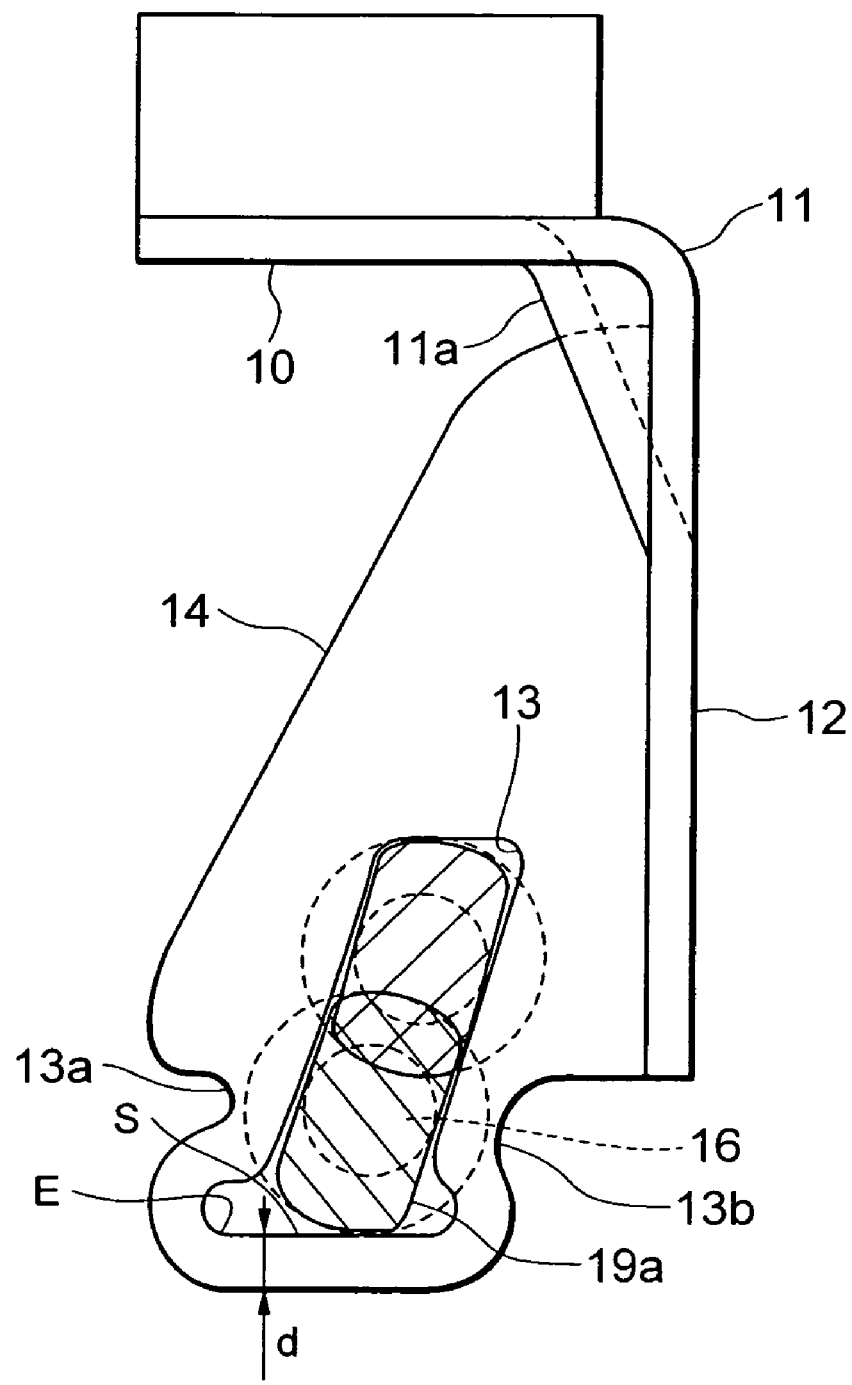
FIG. 5 is an enlarged side view of a car body sided upper bracket (tilt bracket) of the impact absorbing type steering column apparatus for the automotive vehicle shown in FIG. 1.
Figure 6:
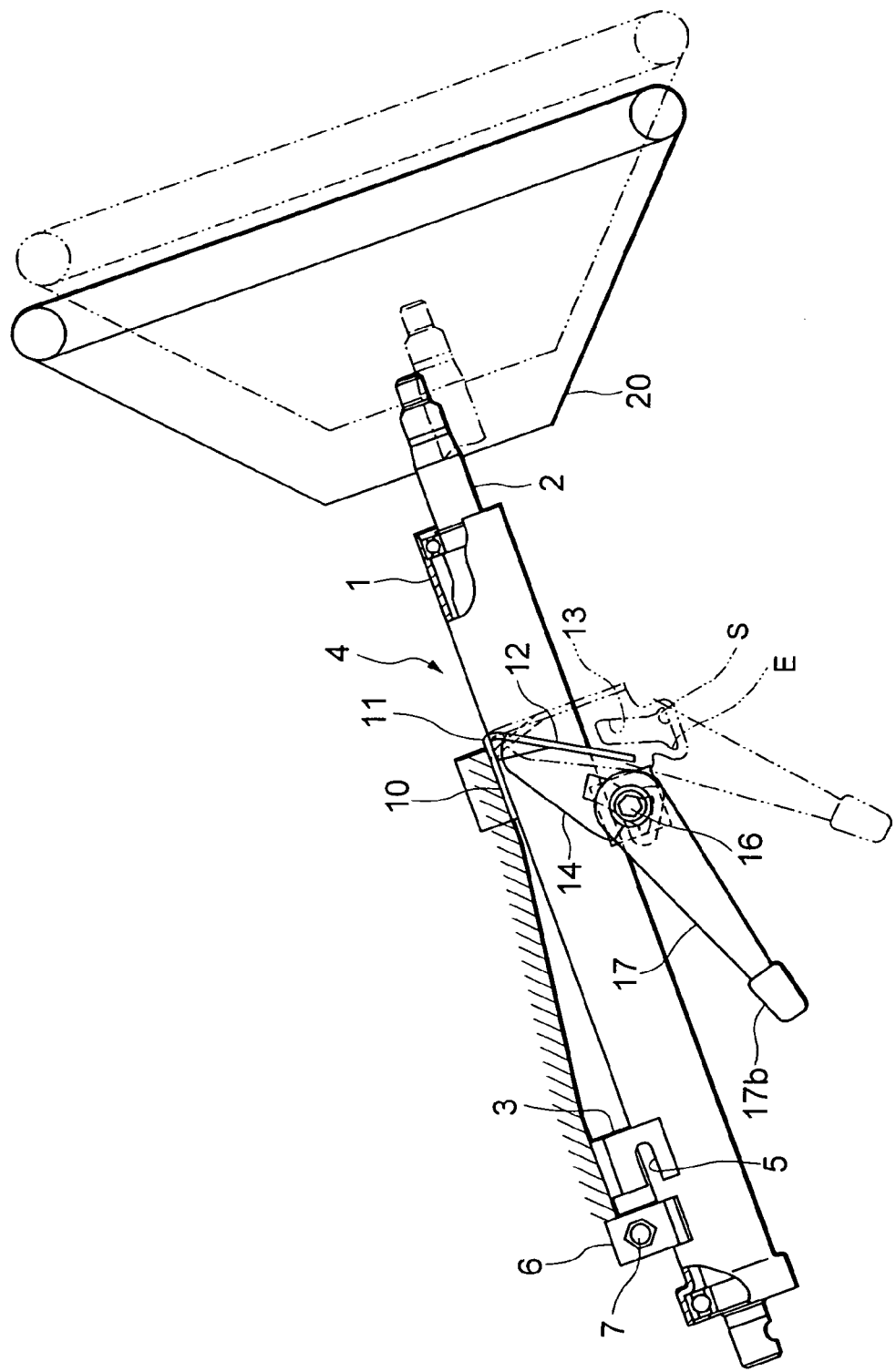
FIG. 6 is a side view showing an early stage of a secondary collision in a state where the impact absorbing type steering column apparatus for the automotive vehicle is mounted in a real car.
Figure 7:
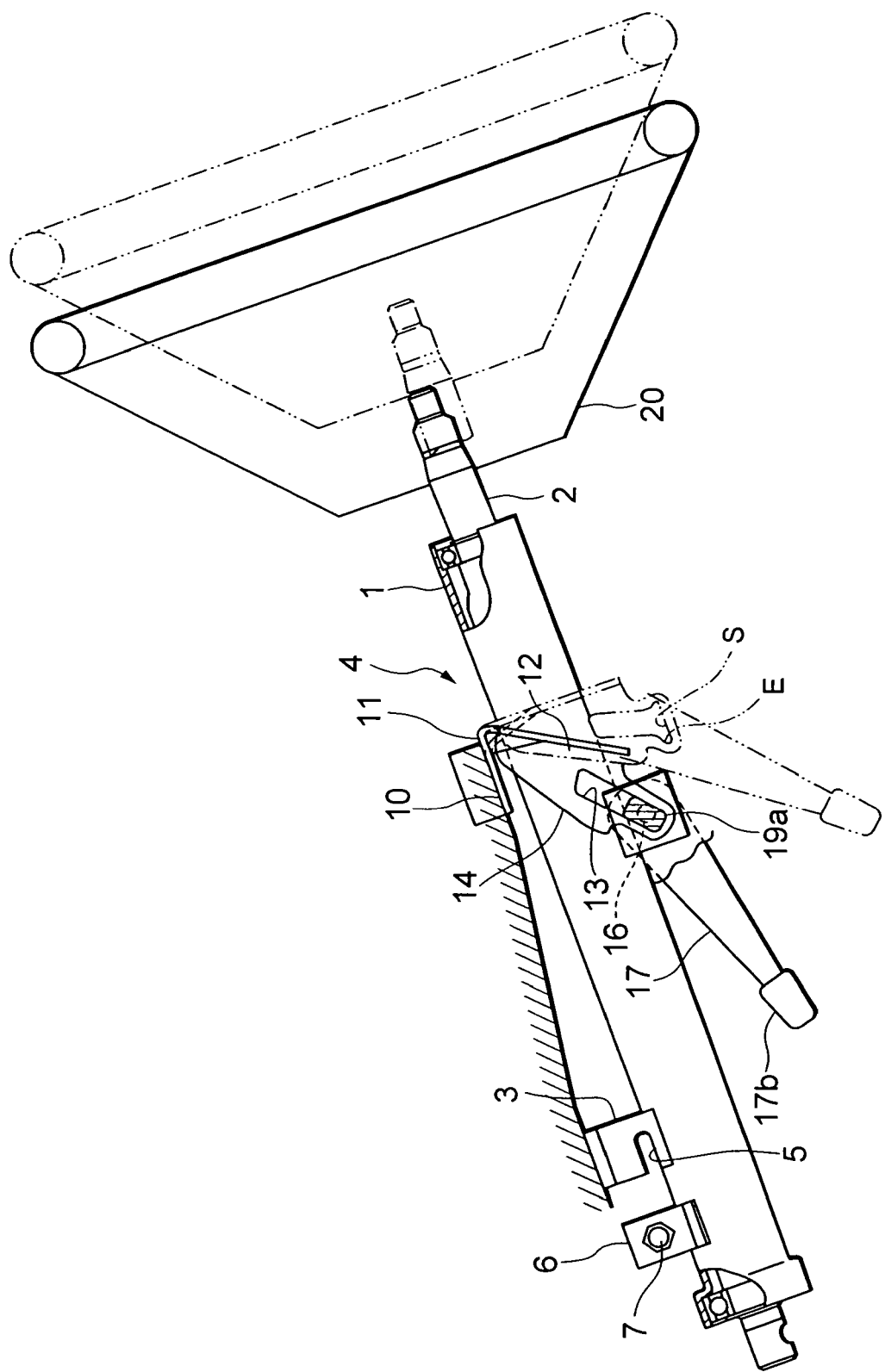
FIG. 7 is a side view showing a later stage of the secondary collision in the state where the impact absorbing type steering column apparatus for the automotive vehicle is mounted in the real car.

FIG. 1 is a side view of the impact absorbing type steering column apparatus for the automotive vehicle according to a first embodiment of the present invention. FIG. 2 is a plan view of the impact absorbing type steering column apparatus for the automotive vehicle shown in FIG. 1. FIG. 3 is a sectional view taken along the line A-A in FIG. 1. FIG. 4 is a sectional view taken along the line B-B in FIG. 1. FIG. 5 is an enlarged side view of a car body sided upper bracket (tilt bracket) of the impact absorbing type steering column apparatus for the automotive vehicle shown in FIG. 1. FIG. 6 is a side view showing an early stage of a secondary collision in a state where the impact absorbing type steering column apparatus for the automotive vehicle is mounted in a real car. FIG. 7 is a side view showing a later stage of the secondary collision in the state where the impact absorbing type steering column apparatus for the automotive vehicle is mounted in the real car.

As shown in FIG. 1, a steering shaft 2, to which a steering wheel (FIG. 6) is attached at a right side end thereof in FIG. 1, is rotatably supported through bearings 1a, 1b within a steering column 1. The steering column 1 is secured to a strength member of the car body through a car body sided lower bracket 3 at its lower side end portion and through a car body sided upper bracket (tilt bracket) 4 taking substantially an L-shape as viewed from a side surface at its intermediate portion.

As illustrated in FIGS. 1 and 4, the car body sided lower bracket 3 includes a pair of car body fitting portions 3a, 3b horizontally extending. The lower bracket 3 also includes a pair of face-to-face plate portions 3c, 3d disposed right and left and extending substantially in vertical directions from the pair of car body fitting portions 3a, 3b.

A column sided lower bracket 6 of the steering column 1 is fixed by welding to a cylindrical outer peripheral surface of the steering column 1.

The column sided lower bracket 6 has face-to-face plate portions 6a, 6b that face the face-to-face plate portions 3a, 3d of the car body sided lower bracket 6. The face-to-face plate portions 6a, 6b are formed with round holes 6c, 6d.

The face-to-face plate portions 6a, 6b of the column sided lower bracket 6 are so held (nipped) as to be slidable in between the face-to-face plate portions 3c, 3d of the car body sided lower bracket 3.

The face-to-face plate portions 3c, 3d of the car body sided lower bracket 3 are formed with cut-away portions 5a, 5b opened in the front of the vehicle.

A tilt center bolt 7 inserted through the round holes 6c, 6d of the column sided lower bracket 6 of the steering column 1, is secured into these cut-away portions 5a, 5b, and, with this contrivance, the steering column 1 becomes movable towards the front of the vehicle when the secondary collision occurs.

It should be noted that as a substitute configuration for the illustrative example given above, the car body sided lower bracket may be formed with the round holes, and the column sided lower bracket may be formed with the cut-away portions opened in the opposite direction, thereby configuring a release structure against the secondary collision.

As shown in FIGS. 1 and 3, the car body sided upper bracket 4 taking substantially the L-shape is constructed of a car body fitting portion 10 horizontally extending and fitted to the car body through a bolt, etc., a vertical wall portion 12 bent substantially in an L-shape from this car body fitting portion 10 through a bending portion 11, and a column fastening/fixing portion 14 erecting from the vertical wall portion 12 and having a tilt groove 13.

Note that the bending portion 11 extends towards the rear of the car body fitting portion 10, and the fixing portion 14 extends towards the front of the vertical wall portion 12 in this illustrative example.

A distance bracket (column sided upper bracket) 15 fixed by welding or the like to the steering column 1 is slidably provided between the column fastening/fixing portions 14, 14 of the car body sided upper bracket (tilt bracket) 4. A tilt position fastening bolt 16 is inserted through tilt adjusting grooves (which will hereinafter simply be called tilt grooves) 13 of the column fastening/fixing portions 14 and through round holes 15a, 15b formed in the distance bracket 15.

A nut 39 is screwed to a screw portion formed at an end portion of the tilt position fastening bolt 16, thereby attaining the fastening fixation.

As a fastening lever 17 attached to a proximal end portion of the fastening bolt 16 is swung, the car body sided upper bracket 4 is brought into press-contact with and fixed to the distance bracket 15 or released from this press-contact, whereby the upper bracket 4 can be fastened or released therefrom. Further, when a positional adjustment is completed, a grip portion 17b of the fastening lever 17 is disposed closer to the front side of the vehicle than the proximal end portion 17a thereof.

Moreover, as illustrated in FIG. 3, a cam lock mechanism is provided at the proximal end portion of the tilt position fastening bolt 16. This cam lock mechanism is provided with a first cam 18 rotating together with the fastening lever 17, and with a non-rotational second cam 19 engaging with and locking the first cam 18.

Further, the second cam 19 is formed with an elliptical protruded portion 19a (FIGS. 3 and 5) engaging with the tilt groove 13 to keep the second cam 19 non-rotational, and moving along the tilt groove 13 when making a tilt adjustment.

Note that the construction is adaptable to a screw-based fastening method other than the cam-based fastening method shown above.

Furthermore, as shown in FIGS. 2 and 3, the bending portion 11 of the car body sided upper bracket 4 is formed with reinforcing beads 11a. A flexural load applied when the secondary collision happens can be adjusted by changing sizes of these reinforcing beads 11a.

As illustrated in FIG. 6, in a state where the impact absorbing type steering column apparatus for the automotive vehicle according to the present embodiment is mounted in the real car, the bending portion 11 and the vertical wall portion 12 are disposed closer to the vehicle rear side than the car body fitting portion 10 of the car body sided upper bracket 4, while the column fastening/fixing portion 14 is disposed closer to the vehicle front side than the vertical wall portion 12. With this arrangement, the tilt fastening bolt 16 is positioned downwardly of the bending portion 11 substantially in the vertical directions.

Moreover, according to this embodiment, as shown in FIG. 5, on a lower side of the tilt groove 13, there is formed a stopper S defined as a restricting member, on which the elliptical protruded portion 19a of the second cam 19 abuts and which is capable of deforming upon the secondary collision. It is to be noted that when making the tilt adjustment, the protruded portion 19a just abuts on the stopper S, however, the stopper S does not deform.

Formed between the stopper S and the tilt groove 13 is an extra stroke portion E taking an elongate hole extending in the front-and-rear directions of the vehicle, and serving as a second restricting portion.

Note that two side portions 13a, 13b of the tilt groove 13 of the column fastening/fixing portion 14 are, as shown in FIG. 5, formed in concave shapes easy to cause the flexural deformation when the secondary collision occurs. Further, a width d of the extra stroke portion E is set substantially uniform throughout the concave portions 13a, 13b.

The stopper S, when in a normal tilt operation, functions as the stopper that receives the abutment of the elliptical protruded portion 19a of the second cam 19 and defines a tilt adjustment range. On the other hand, when the secondary collision happens, the stopper S defines a first predetermined range of a collapsing movement of the steering column 1, and operates to make its flexural deformation as a large load is applied thereto.

As shown in FIGS. 5 and 7, at a later stage of the secondary collision, the elliptical protruded portion 19a of the second cam 19 moves towards the front of the vehicle and comes into the press-contact with the stopper S with the result that the stopper S makes its flexural deformation. Then, the tilt fastening bolt 16 enters the extra stroke portion E as the second restricting portion and causes the flexural deformation of the extra stroke portion E so as to extend in a moving direction of the tilt fastening bolt 16, and further moves over the first predetermined range, thereby absorbing impact energy thereof.

With the aforementioned construction taken, at an early stage of the secondary collision, as illustrated in FIG. 6, when a secondary collision load acts on the steering wheel 20 towards the front of the vehicle from the rear thereof, the steering column 1 tries to move towards the front of the vehicle together with the distance bracket 15 and the tilt fastening bolt 16.

The tilt fastening bolt 16 moves, as shown in FIG. 6, down to the lowest position (which corresponds, however, to (a position of) the stopper S for defining the first predetermined range of the collapsing movement of the steering column in this embodiment) of the tilt groove 13.

On the other hand, as shown in FIG. 6, the column sided lower bracket 6 and the tilt center bolt 7 separate from the car body sided lower bracket 3 in such a way that the tilt center bolt 7 is removed out of the cut-away portions 5a, 5b of the car body sided lower bracket 3, and move towards the front of the vehicle.

On this occasion, an impact load on a driver acts substantially horizontally towards the front of the vehicle from the rear thereof. On the other hand, the tilt fastening bolt 16 is disposed downwardly of the bending portion 11 substantially in the vertical directions, then starts moving with the bending portion 11 used as a fulcrum substantially in the horizontal direction, and subsequently rotates around the bending portion 11 (fulcrum).

With this contrivance, as shown in FIG. 6, in the impact absorbing type steering column apparatus for the automotive vehicle according to the present embodiment, the vertical wall portion 12 and the column fastening/fixing portion 14 of the car body sided upper bracket 4 get collapsed while making their flexural deformations so as to rotate around the bending portion 11 (fulcrum), thereby absorbing secondary impact energy.

Thus, according to the present embodiment, the bending portion 11 and the vertical wall portion 12 are disposed closer to the rear side of the vehicle than the car body fitting portion 10, while the column fastening/fixing portion 14 is disposed closer to the front side of the vehicle than the vertical wall portion 12. Owing to this layout, upon the secondary collision, the vertical wall portion 12 and the column fastening/fixing portion 14 of the car body sided upper bracket 4 start moving in the rotating direction around the bending portion 11 as the fulcrum, however, the moving direction is substantially horizontal and substantially coincident with an input direction (which is substantially horizontal) of the impact load from the driver. Accordingly, the starting movement of the car body sided upper bracket 4 can be stabilized when the secondary collision happens.

Moreover, according to the present embodiment, the grip portion 17b of the fastening lever 17 is disposed closer to the front side of the vehicle than the proximal end portion 17a thereof. Besides, upon the secondary collision, as shown in FIG. 6, the fastening lever 17 follows the collapsing motion of the car body sided bracket 4 and moves towards the front of the vehicle while rotating. It is therefore possible to further enhance the safety of the fastening lever 17 against striking on knees of the driver.

At the later stage of the secondary collision, as shown in FIG. 7, the steering column 1 has a contrivance of being movable along the extra stroke portion E over the first predetermined range as follows.

At the end of the early stage of the secondary collision, the steering column 1 reaches a terminal of the first predetermined range of the collapsing movement. To be specific, as illustrated in FIG. 5, the tilt fastening bolt 16 moves down to the lowest position of the tilt groove 13, and the elliptical protruded portion 19a of the second cam 19 is brought into the press-contact with the stopper S that has been defining the first predetermined range.

As indicated by a solid line in FIG. 7, at the later stage of the secondary collision, the elliptical protruded portion 19a comes into the press-contact with the stopper S, thereby causing the flexural deformation of the stopper S. Then, the tilt fastening bolt 16 enters the extra stroke portion E as the second restricting portion and causes the flexural deformation of the extra stroke portion E so as to extend in the moving direction of the tilt fastening bolt 16, and moves over the first predetermined range as being regulated by the extra stroke portion E defined as the second restricting portion and further into a second predetermined range, thereby absorbing impact energy thereof. Note that the early stage and the later stage of the secondary collision are within a series of continuous movements but do not imply different movements or operations.

From what has been described so far, according to the present embodiment, the steering column 1, when reaching the terminal of the first predetermined range, causes the stopper S to deform and moves along the extra stroke portion E beyond the first predetermined range, whereby the impact energy thereof can be absorbed.

Hence, depending on a type and a shipping destination of the automotive vehicle, it is possible to surely meet a demand that the stroke of the steering column 1 be extended over the stroke end thereof.

It should be noted that if a grease containing an extreme-pressure additive such as molybdenum disulfide, etc. is applied over the tilt groove 13, the elliptical protruded portion 19a can slide on the interior of the tilt groove 13 more effectively in the embodiment discussed above.

Further, the grease containing the extreme-pressure additive such as molybdenum disulfide, etc. may be applied also to between the distance bracket 15 and the column fastening/fixing portion 14 and between the column fastening/fixing portion 14 and the nut 39 or the second cam 19.

Modified Example of First Embodiment

Figure 8:
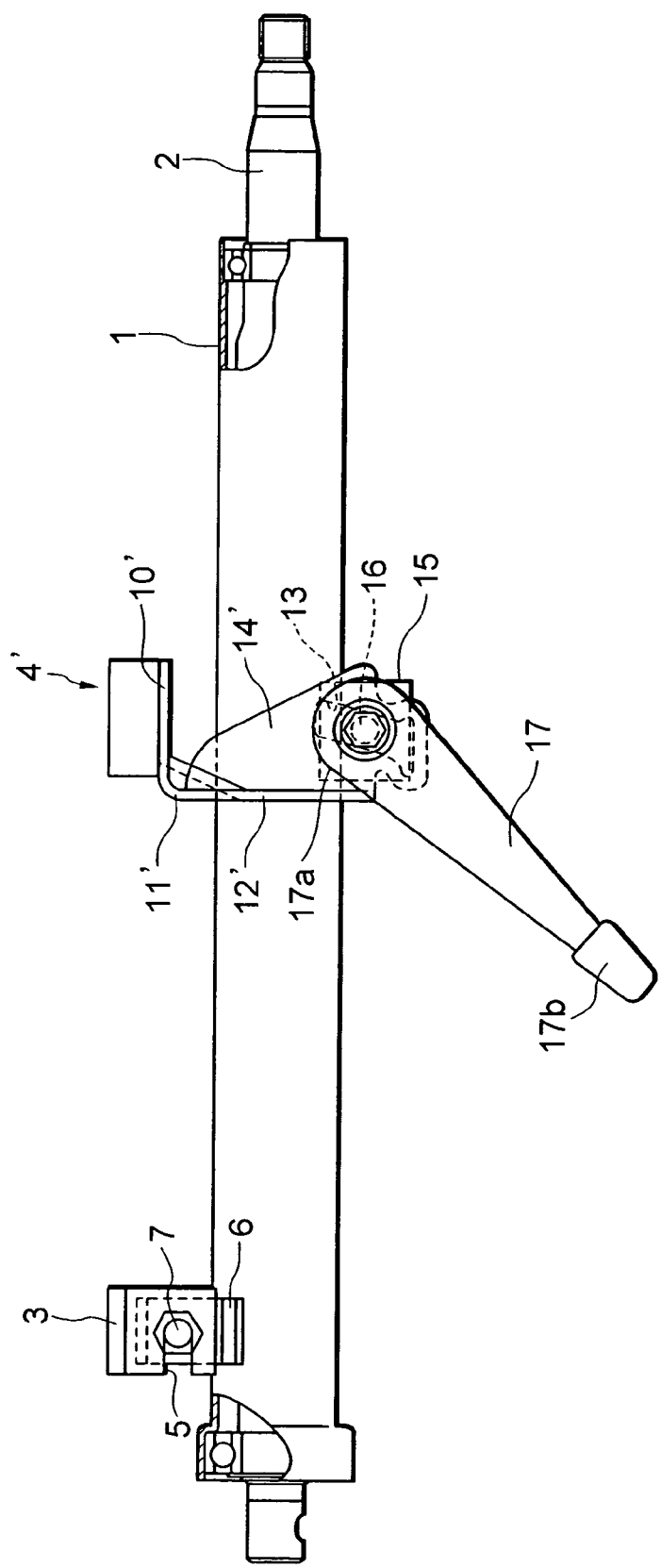
FIG. 8 is a side view of a modified example of the impact absorbing type steering column apparatus for the automotive vehicle in the first embodiment of the present invention.

FIG. 8 shows a modified example of the first embodiment discussed above. In a car body sided upper bracket (tilt bracket) 4' shown in FIG. 8, a bending portion 11' and a vertical wall portion 12' are integrally formed in the front of a car body fitting portion 10', and a column fastening/fixing portion 14' is disposed closer to the rear side of the vehicle than the vertical wall portion 12'. Accordingly, in this modified example, the vertical wall portion 12' of the car body side upper bracket is closer to the front side of the vehicle than the vertical wall portion 12 in the first embodiment discussed above. Other portions have the same configurations as in the first embodiment illustrated in FIG. 1, and the same portions are shown by marking them with the same numerals and symbols, and their explanations are omitted.

According to this modified example, the vertical wall portion 12' is provided closer to the front side of the vehicle than the vertical wall portion 12 in the first embodiment, and hence, when the secondary collision happens, the swing range of the steering column can be enlarged, and the collapse stroke can be taken large.

Second Embodiment

Figure 9:
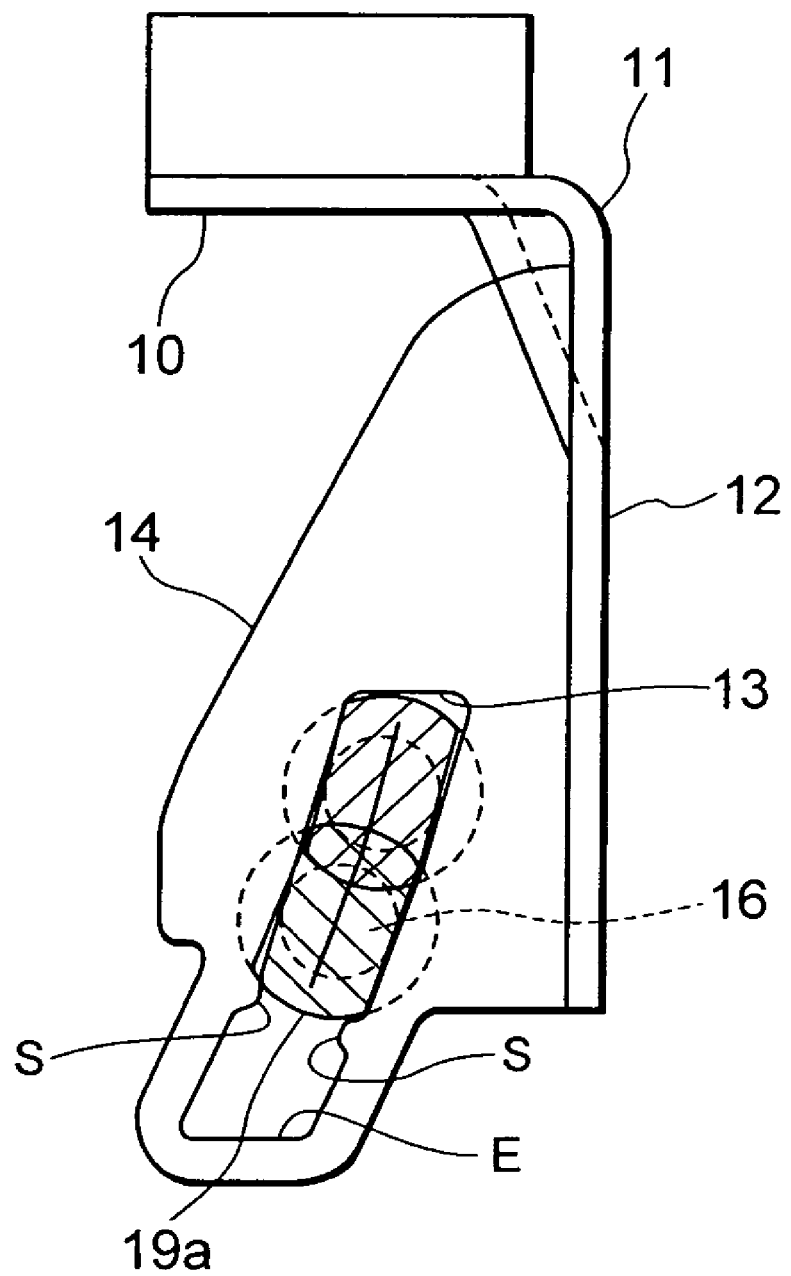
FIG. 9 is an enlarged side view of a car body sided upper bracket (tilt bracket) mounted in the impact absorbing type steering column apparatus for the automotive vehicle according to a second embodiment of the present invention.

FIG. 9 is an enlarged side view of the car body sided upper bracket (tilt bracket) attached to the impact absorbing type steering column apparatus for the automotive vehicle according to a second embodiment of the present invention.

In the second embodiment, as shown in FIG. 9, the stoppers S are formed as a pair of protrusions (lumps) facing each other. The extra stroke portion E as the second restricting portion is previously formed as an elongate hole suitable for guiding the tilt fastening bolt 16 in its moving direction when the secondary collision occurs. Other configurations and operations are the same as in the first embodiment discussed above.

Note that an interval between font side ends of the pair of protruded stoppers S is set narrower than a width of the elliptical protruded portion 19a.

From the above, according to the second embodiment, at the end of the early stage of the secondary collision, the steering column 1 is restricted by the first restricting portion of the restricting member, and thus reaches the terminal of the first predetermined range of the collapsing movement. Namely, as shown in FIG. 9, the tilt fastening bolt 16 moves down to the lowest position of the tilt groove 13, and the elliptical protruded portion 19a of the second cam 19 is brought into the press-contact with the stoppers S serving as the restricting members.

At the later stage of the secondary collision, the elliptical protruded portion 19a comes into the press-contact with the stoppers S and intrudes itself over the stoppers S (or causes the flexural deformations of the stoppers S). Hereupon, the tilt fastening bolt 16 enters the extra stroke portion E defined as the second restricting portion and moves along this extra stroke portion E.

Note that the extra stroke portion E may take its elongate hole shape configured by combining the elongate hole extending in the front-and-rear direction as adopted in the first embodiment with the elongate hole extending substantially in the vertical directions as adopted in the second embodiment. In this case, the collapsing movement can gain a further extension.

Third Embodiment

Figure 10:
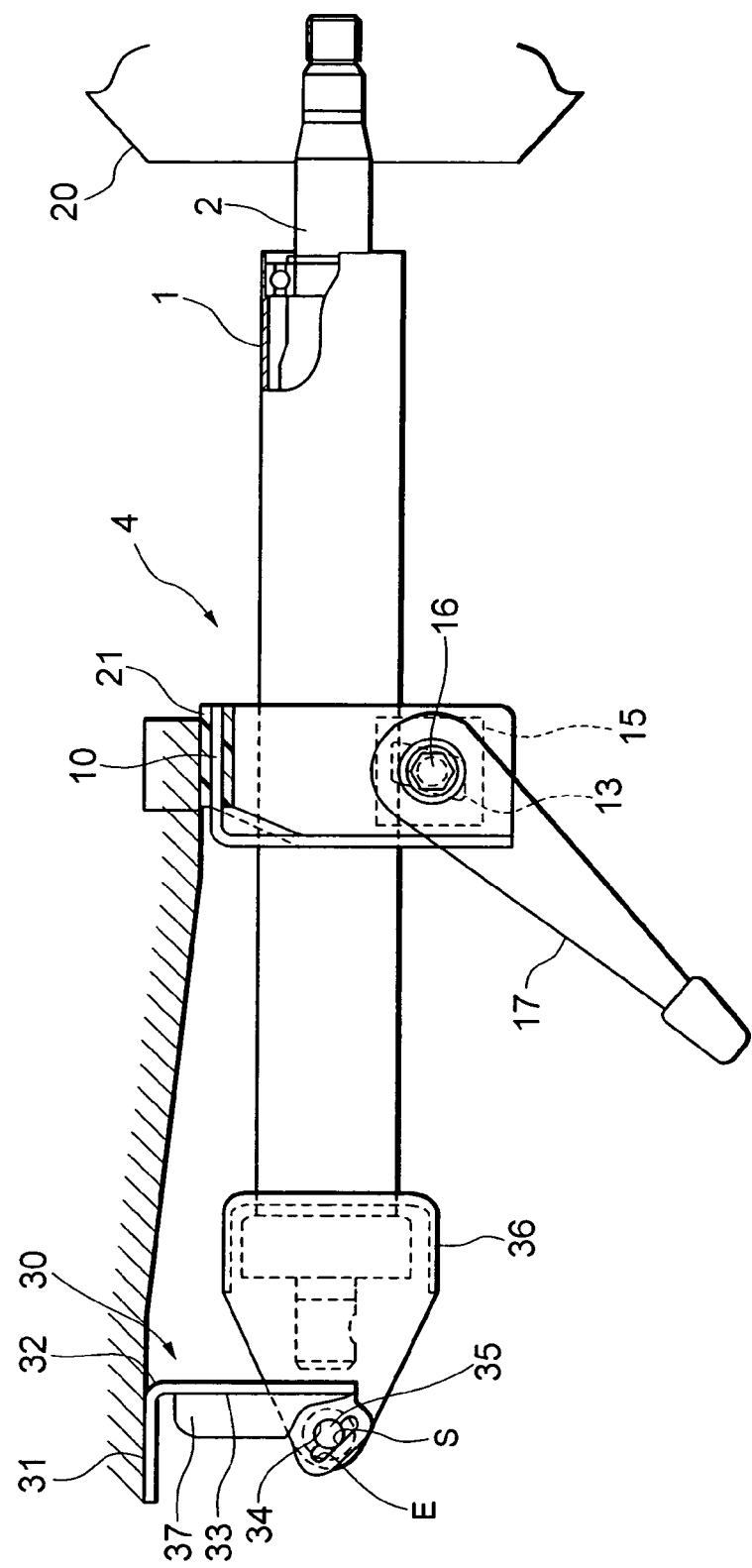
FIG. 10 is a side view of the impact absorbing type steering column apparatus for the automotive vehicle according to a third embodiment of the present invention.

FIG. 10 is a side view of the impact absorbing type steering column apparatus according to a third embodiment of the present invention.

In the third embodiment, as illustrated in FIG. 10, a flange of the car body fitting portion 10 of the car body sided upper bracket (tilt bracket) 4 is provided with a release capsule 21 made of a resin, for releasing the car body sided upper bracket 4 from the car body upon the secondary collision. With this contrivance, upon the secondary collision, the operation is not that the car body sided upper bracket 4 makes the flexural deformation as seen in the embodiments discussed above but that the upper bracket 4 releases from the car body and moves forwards.

A car body sided lower bracket 30 is of such a type as to absorb the impact energy by making the flexural deformation. The car body sided lower bracket 30 is constructed of a car body fitting portion 31 fitted to the car body by use of bolts, etc., a vertical wall portion 33 extending from the car body fitting portion 31, bent substantially in an L-shape through a bending portion 32 and disposed in the rear of the car body fitting portion 31, a bolt fixing plate portion 37 formed in front of the vertical wall portion 33, and so on.

Further, the grease containing the extreme-pressure additive such as molybdenum disulfide, etc. may be applied to between the stopper S, the hole of the extra stroke portion E, the bolt fastening/fixing portion 14 and a column sided lower bracket 36.

The car body sided lower bracket 30 is formed with a support hole 34 for a tilt hinge. A tilt hinge pin 35 for determining a tilt center is inserted in between the support hole 34 and the column sided lower bracket 36 of the steering column 1.

Moreover, according to the third embodiment, the stopper S is formed on the lower side of the support hole 34. The stopper S, on which the tilt hinge pin 35 abuts, deforms when the secondary collision happens.

The extra stroke portion E formed with an elongate hole extending in the front-and-rear directions of the vehicle, is formed between the stopper S and the support hole 34.

The stopper S as the restricting member, when in the normal tilt operation, functions as the stopper that abuts on the tilt hinge pin 35 and holds it within the support hole 34. On the other hand, when the secondary collision happens, the stopper S defines the first predetermined range of the collapsing movement of the steering column 1, and operates to make its flexural deformation as a large load is applied thereto.

More specifically, at the later stage of the secondary collision, the tilt hinge pin 35, after causing the deformation of the stopper S, enters the extra stroke portion E and causes this extra stroke portion E to deform so as to extend in a moving direction of the tilt hinge pin 35, thereby absorbing the impact energy.

With the thus-contrived construction, at the early stage of the secondary collision, when the secondary impact load acts on the steering wheel 20 towards the front of the vehicle from the rear thereof, the steering column 1 tries to move towards the front of the vehicle together with the car body sided upper bracket 4 and the distance bracket 15 by dint of an operation of the release capsule 21.

On this occasion, the impact load on the driver acts substantially horizontally towards the front of the vehicle from the rear thereof. On the other hand, the tilt hinge pin 35 is disposed downwardly of the bending portion 32 substantially in the vertical directions, then starts moving with the bending portion 32 used as a fulcrum substantially in the horizontal direction, and subsequently rotates around the bending portion 32 (fulcrum).

With this contrivance, the vertical wall portion 33 gets collapsed while making the flexural deformation so as to rotate around the bending portion 32 (fulcrum), thereby absorbing the secondary impact energy.

Next, at the later stage of the secondary collision, the steering column 1 moves over the first predetermined range defined by the first restricting portion and can further move along the extra stroke portion E as the second restricting portion for defining a second predetermined range.

At the end of the early stage of the secondary collision, the steering column 1 reaches the terminal of the first predetermined range. Namely, the tilt hinge pin 35 is brought into the press-contact with the stopper S.

At the later stage of the secondary collision, the tilt hinge pin 35 comes into the press-contact with the stopper S with the result that the stopper S is made to deform. Then, the tilt hinge pin 35 enters the extra stroke portion E and causes the flexural deformation of the extra stroke portion E so as to extend in the moving direction of the tilt hinge pin 35, and, this being done, moves over the terminal portion of the first predetermined range, thereby absorbing the impact energy thereof. Note that the early stage and the later stage of the secondary collision are within a series of continuous movements but do not imply different movements or operations.

From what has been described so far, according to the third embodiment, the steering column 1, when reaching the terminal of the first predetermined range equal to the normally-set collapsing movement, causes the deformation of the stopper S as the restricting member that has formed this terminal and moves along the extra stroke portion E as the second restricting portion beyond the this terminal, whereby the impact energy thereof can be absorbed.

Hence, depending on a type and a shipping destination of the automotive vehicle, it is possible to surely meet a demand that the movement (stroke) of the steering column 1 be extended over the stroke end thereof.

It should be noted that the third embodiment may be combined with the first embodiment or the second embodiment.

Fourth Embodiment

Figure 11:
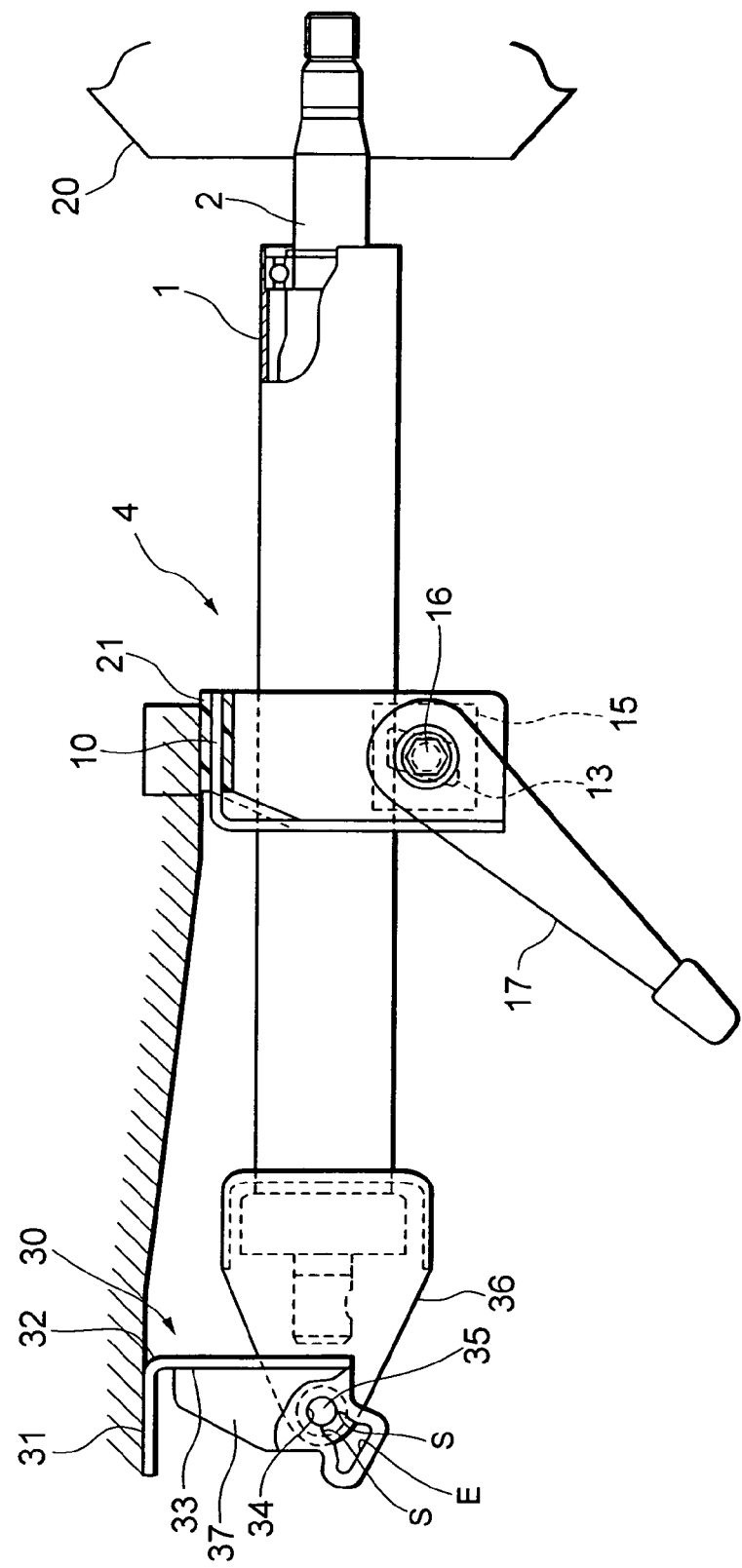
FIG. 11 is a side view of the impact absorbing type steering column apparatus for the automotive vehicle according to a fourth embodiment of the present invention.

FIG. 11 is a side view of the impact absorbing type steering column apparatus for the automotive vehicle according to a fourth embodiment of the present invention.

In the fourth embodiment, as shown in FIG. 11, the stoppers S as the restricting members are formed as a pair of protrusions (lumps) facing each other, and the extra stroke portion E configuring the second restricting portion is previously formed as an elongate hole extending obliquely downwards so as to guide the tilt hinge pin 35 in its moving direction when the secondary collision occurs. Other configurations and operations are the same as in the embodiments discussed above.

From the above, according to the fourth embodiment, at the end of the early stage of the secondary collision, the steering column 1 reaches the terminal of the first predetermined range while making the collapsing movement as restricted by one restricting portion. To be specific, the tilt hinge pin 35 is brought into the press-contact with the stoppers S configuring the restricting members.

At the later stage of the secondary collision, the tilt hinge pin 35 comes into the press-contact with the stoppers S and causes the stoppers S to deform. Then, the tilt hinge pin 35 enters the extra stroke portion E configuring the second restricting portion of the restricting member, and can further move along the extra stroke portion E.

Note that the extra stroke portion E may take its elongate hole shape configured by combining the elongate hole extending in the front-and-rear direction as adopted in the third embodiment with the elongate hole extending substantially in the vertical directions as adopted in the present fourth embodiment. In this case, the collapsing movement can gain a further extension.

Moreover, the fourth embodiment may be combined with the first embodiment or the second embodiment.

It is to be noted that the present invention is not limited to the embodiments discussed above and can be modified in a variety of forms.

For example, in the first through fourth embodiments discussed above, the vertical wall portion may be disposed in front or in rear of the car body fitting portion without being limited to the upper and lower side brackets, and the column fastening/fixing portion may be disposed in front or in rear of the vertical wall portion.

Further, in the embodiments discussed above, the extra stroke may be provided on one side or both sides of the column fastening/fixing portion. In the case of providing the extra stoke on only one side thereof, the tilt groove on the other side of the column fastening/fixing portion may be opened on its lower side or may be extended without providing the energy absorbing portion, and so on.

Figure 12:
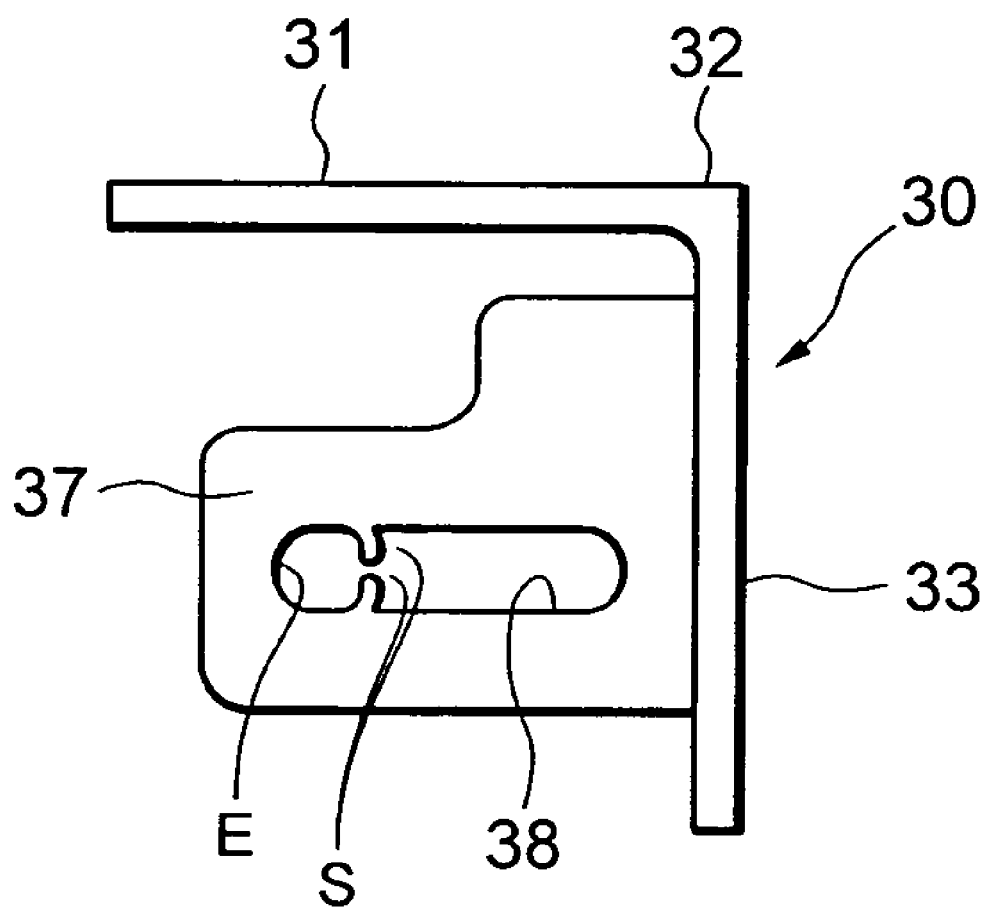
FIG. 12 is a side view of the car body sided lower bracket according to modified examples of the third and fourth embodiments.

Moreover, as shown in FIG. 12, in a steering column apparatus capable of making a telescopic adjustment, a bolt fixing plate portion 37 of the car body sided lower bracket 30 employed in the third and fourth embodiments, may be formed with an elongate hole 38 for the telescopic adjustment, a pair of protruded stoppers S and the extra stroke portion E (the second restricting portion).

As discussed above, according to the fourth embodiment, upon the secondary collision, the steering column, when moving up to the terminal of the first predetermined range as being restricted by the first restricting portion, causes the restricting member to deform and further makes its collapsing movement along the second restricting portion beyond this terminal. Hence, depending on a type and a shipping destination of the automotive vehicle, it is possible to surely meet a demand for the proper adjustment.

Fifth Embodiment

Figure 13:
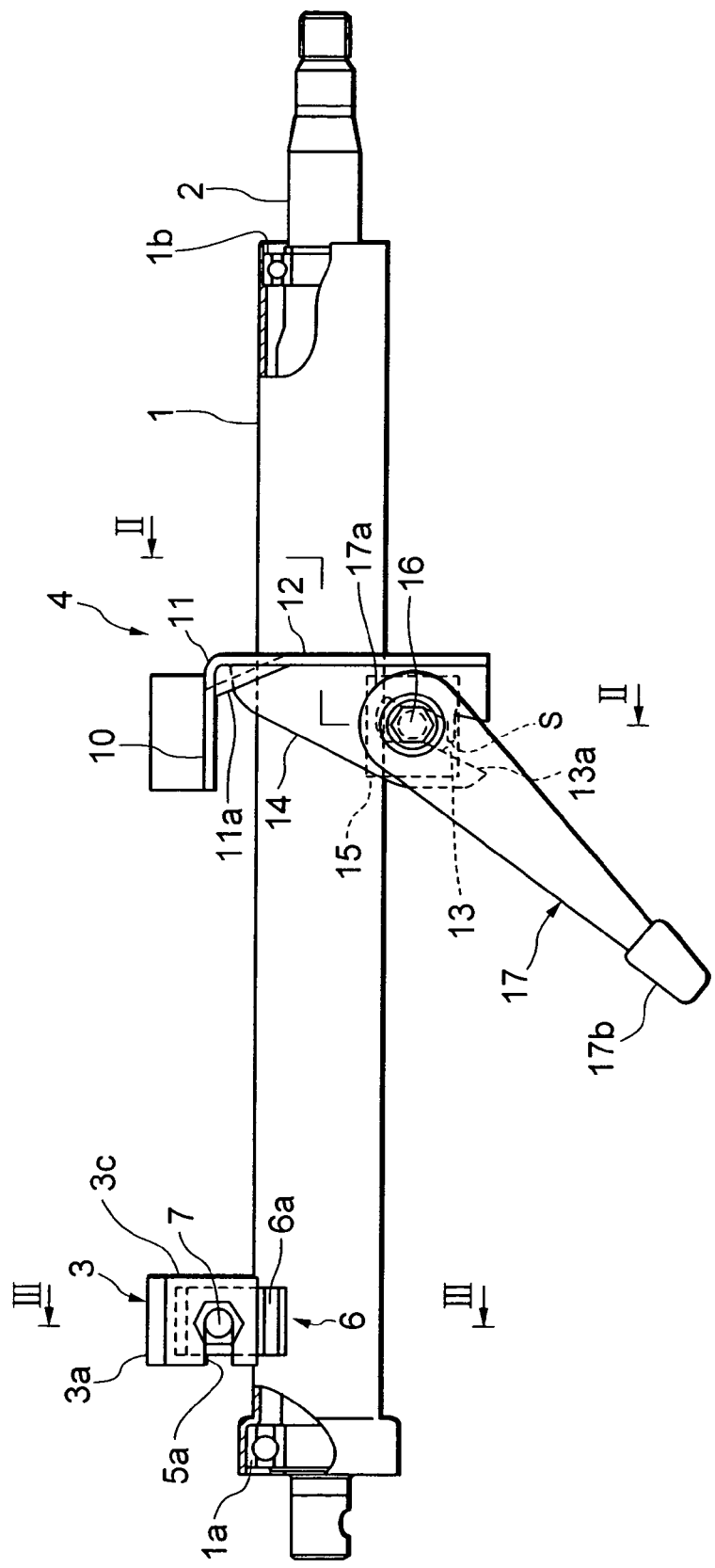
FIG. 13 is a side view of the impact absorbing type steering column apparatus for the automotive vehicle according to a fifth embodiment of the present invention.

FIG. 13 is a side view of the impact absorbing type steering column apparatus for the automotive vehicle according to a fifth embodiment of the present invention.

Figure 14A:
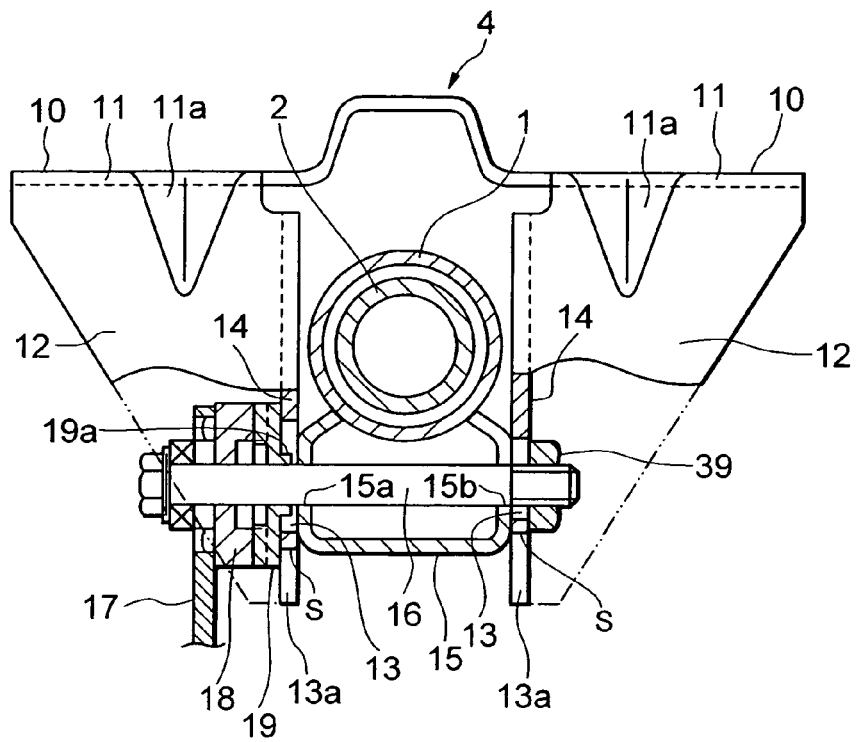
FIG. 14A is a sectional view taken along the line II-II in FIG. 13.
Figure 14B:
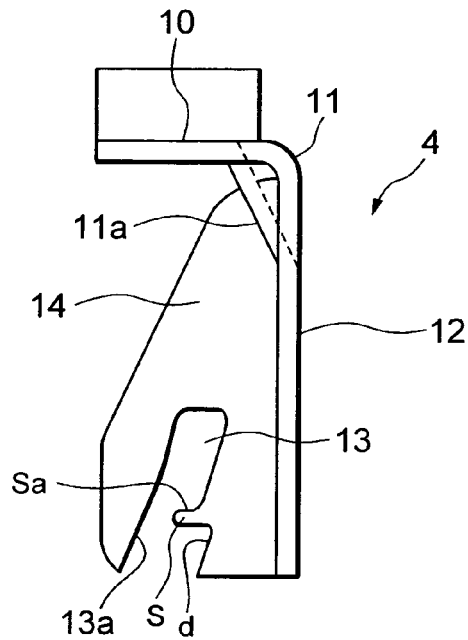
FIG. 14B is an enlarged side view of the car body sided upper bracket (tilt bracket) of the impact absorbing type steering column apparatus for the automotive vehicle shown in FIG. 13.

FIG. 14A is a sectional view taken along the line II-II in FIG. 13. FIG. 14B is an enlarged side view of a car body sided upper bracket (tilt bracket) of the impact absorbing type steering column apparatus shown in FIG. 13.

Figure 15:
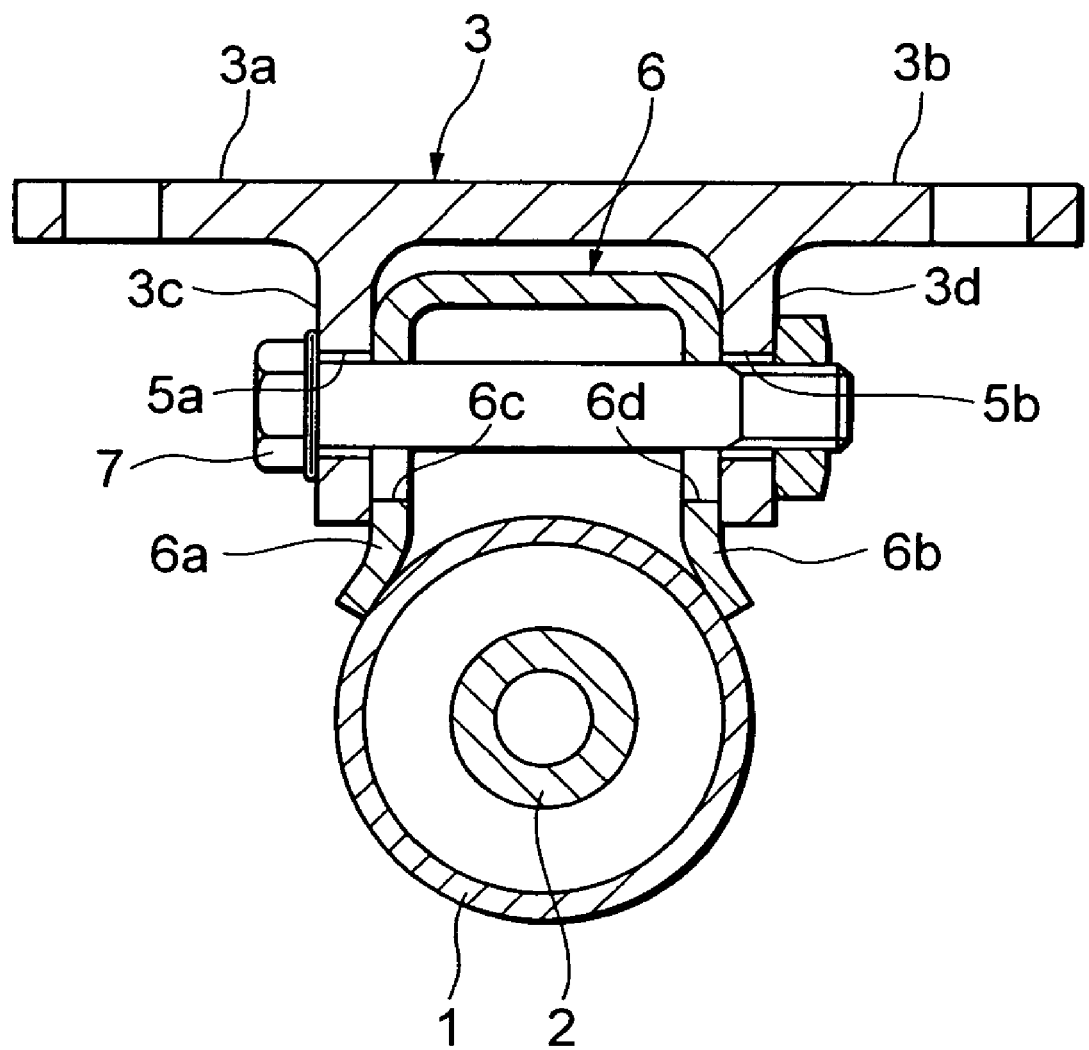
FIG. 15 is a sectional view taken along the line III-III in FIG. 13.

FIG. 15 is a sectional view taken along the line III-III in FIG. 13.

Figure 16:
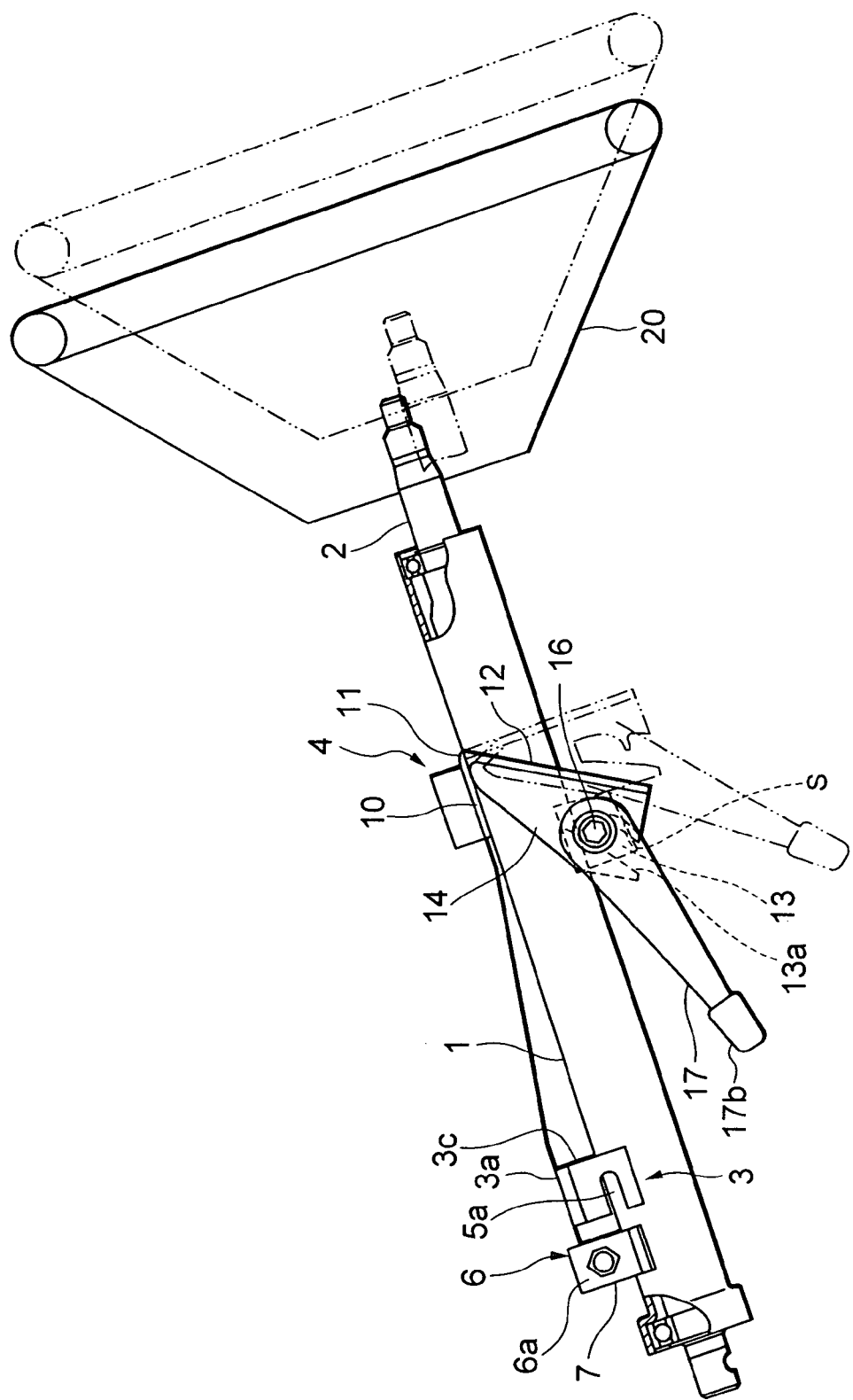
FIG. 16 is a side view showing the early stage of the secondary collision in the state where the impact absorbing type steering column apparatus for the automotive vehicle is mounted in the real car.

FIG. 16 is a side view showing an early stage when a secondary collision happens in a state where the impact absorbing type steering column apparatus for the automotive vehicle is mounted in a real car.

Figure 17:
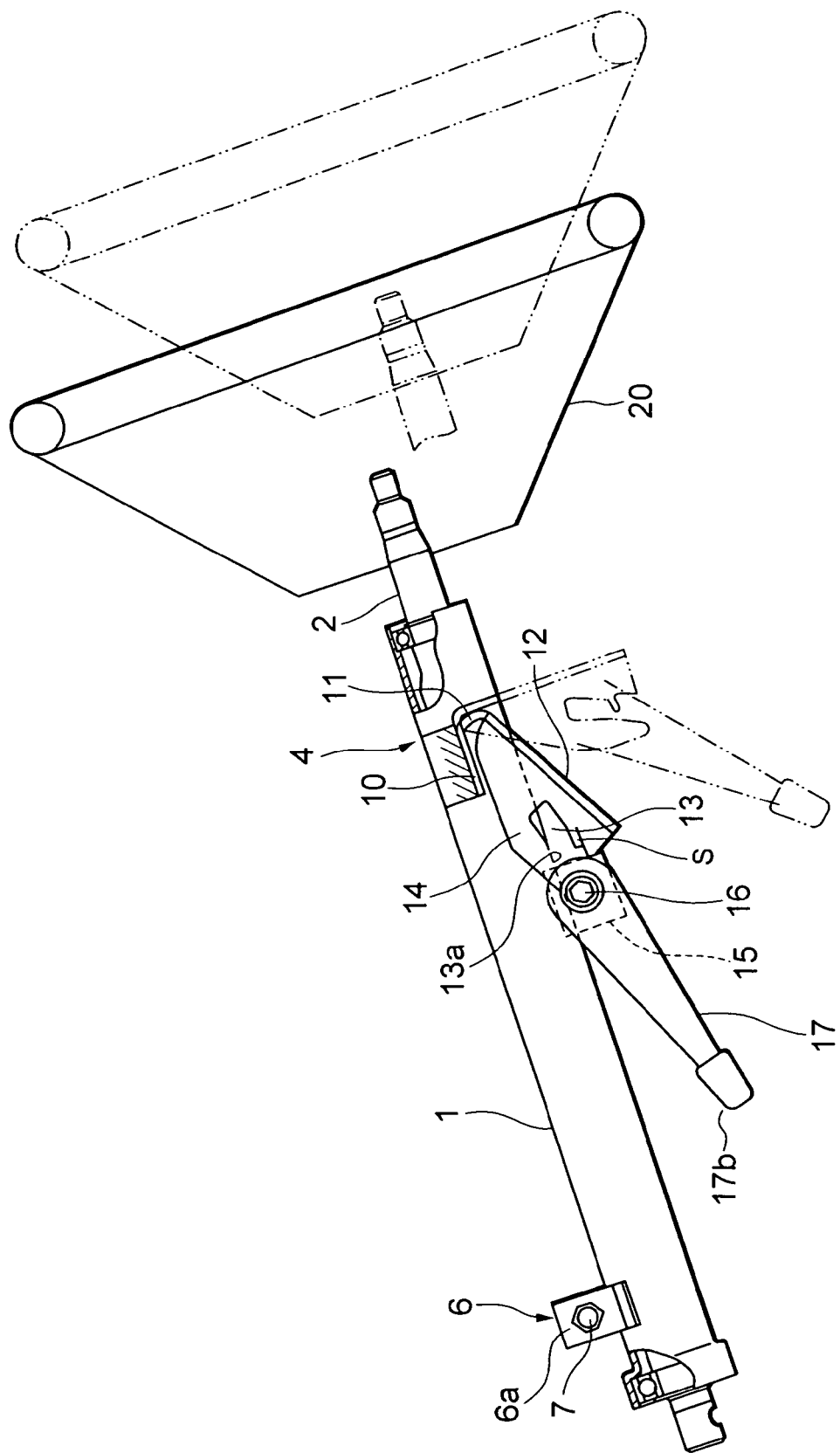
FIG. 17 is a side view showing the later stage of the secondary collision in the state where the impact absorbing type steering column apparatus for the automotive vehicle is mounted in the real car.

FIG. 17 is a side view showing a later stage when the secondary collision happens in the state where the impact absorbing type steering column apparatus for the automotive vehicle is mounted in the real car.

As shown in FIG. 13, the steering shaft 2, to which a steering wheel 20 (FIG. 16) is attached at a right side end thereof, is rotatably supported through a pair of bearings 1a, 1b within the steering column 1. The steering column 1 is secured to a strength member of the car body through the car body sided lower bracket 3 at its lower side end portion and through the car body sided upper bracket (tilt bracket) 4 taking substantially an L-shape as viewed from a side surface at its intermediate portion.

As illustrated in FIGS. 13 and 16, the car body sided lower bracket 3 includes the pair of car body fitting portions 3a, 3b. The lower bracket 3 also includes the pair of face-to-face plate portions 3c, 3d disposed right and left and extending substantially in a vertical direction from the pair of car body fitting portions 3a, 3b.

The column sided lower bracket 6 of the steering column 1 is fixed by welding to a cylindrical outer peripheral surface of the steering column 1.

The column sided lower bracket 6 has the face-to-face plate portions 6a, 6b that face the face-to-face plate portions 3a, 3d of the car body sided lower bracket 6. The face-to-face plate portions 6a, 6b are formed with the round holes 6c, 6d.

The face-to-face plate portions 6a, 6b of the column sided lower bracket 6 are so held (nipped) as to be slidable in between the face-to-face plate portions 3c, 3d of the car body sided lower bracket 3.

The face-to-face plate portions 3c, 3d of the car body sided lower bracket 3 are formed with the cut-away portions 5a, 5b opened in the front of the vehicle.

The tilt center bolt 7 inserted through the round holes 6c, 6d of the column sided lower bracket 6 of the steering column 1, is secured into these cut-away portions 5a, 5b, and, with this contrivance, the steering column 1 becomes movable towards the front of the vehicle when the secondary collision occurs.

It should be noted that as a substitute configuration for the illustrative example given in the fifth embodiment, the car body sided lower bracket may be formed with the round holes, and the column sided lower bracket may be formed with the cut-away portions opened in the opposite direction, thereby configuring a release structure against the secondary collision.

As shown in FIGS. 14A and 15, the car body sided upper bracket 4 taking substantially the L-shape is constructed of the car body fitting portions 10, 10 fitted to the strength member of the car body through bolts, etc., the vertical wall portions 12, 12 bent substantially in the L-shape from the car body fitting portions 10, 10 through the bending portions 11, 11, and the column fastening/fixing portions 14, 14 erecting from the vertical wall portions 12, 12 and having the tilt grooves 13, 13 for the tilt adjustment.

Note that the bending portions 11, 11 are disposed in rear of the car body fitting portions 10, 10, while the column fastening/fixing portions 14, 14 are disposed in front of the vertical wall portions 12, 12 in the present illustrative example in the fifth embodiment.

The distance bracket (column sided upper bracket) 15 fixed by welding or the like to the steering column 1 is slidably provided between the column fastening/fixing portions 14, 14 of the car body sided upper bracket (tilt bracket) 4. The fastening bolt 16 is inserted through the tilt adjusting grooves 13 of the column fastening/fixing portions 14 and through the round holes 15a, 15b formed in the distance bracket 15.

The nut 39 is screwed to the screw portion formed at the side end portion of this fastening bolt 16, thereby attaining the fastening fixation.

As the fastening lever 17 attached to the proximal end portion of the fastening bolt 16 is swung, the car body sided upper bracket 4 is brought into the press-contact with and fixed to the distance bracket 15 or released from this press-contact, whereby the upper bracket 4 can be fastened or released therefrom. Further, when the positional adjustment is completed, the grip portion 17b of the fastening lever 17 is disposed closer to the front side of the vehicle than the proximal end portion 17a thereof.

Moreover, as illustrated in FIG. 14A, a cam lock mechanism is provided at the proximal end portion of the fastening bolt 16. This cam lock mechanism is provided with the first cam 18 rotating together with the fastening lever 17, and with the non-rotational second cam 19 engaging with and locking the first cam 18.

Further, the second cam 19 is formed with the elliptical protruded portion 19a (FIG. 14A) engaging with the tilt adjusting groove 13 to keep the second cam 19 non-rotational, and moving along the tilt adjusting groove 13 when making a tilt adjustment.

Note that the construction is adaptable to a screw-based fastening method other than the cam-based fastening method shown above.

Furthermore, as shown in FIGS. 14A and 14B, the bending portion 11 of the car body sided upper bracket 4 is formed with the reinforcing beads 11a. A flexural load applied when the secondary collision happens can be adjusted by changing sizes of these reinforcing beads 11a.

As illustrated in FIG. 16, in a state where the impact absorbing type steering column apparatus for the automotive vehicle according to the fifth embodiment is mounted in the real car, the steering column apparatus is attached generally with a tilt to the car body. In this case, however, a tilt angle preferable to the operability by the driver of an automobile is within a range of 20° through 30°. In the real car, the bending portion 11 and the vertical wall portion 12 are disposed closer to the rear side of the vehicle than the car body fitting portion of the car body sided upper bracket 4, while the column fastening/fixing portion 14 is disposed closer to the front side of the vehicle than this vertical wall portion 12. With this arrangement, the tilt fastening bolt 16 is positioned downwardly of the bending portion 11 substantially in the vertical direction.

In the present fifth embodiment, the tilt adjusting groove 13 is formed substantially in a circular arc with some tilt, and one side end thereof is an open side end 13a.

A protrusion (stopper) S protruding forwardly of car body so as to delimit a tilt adjusting range of the fastening bolt 16, is provided on the rear-of-the-vehicle side of this tilt adjusting groove 13.

This protrusion S has an abutting surface Sa on the side that faces the fastening bolt 16, and this abutting surface Sa functions as a stopper for delimiting a lower side end position of the tilt adjusting range of the fastening bolt 16.

Further, the protrusion (stopper) S is, upon the secondary collision, bent or broken, etc. by the fastening bolt 16, thereby allowing the fastening bolt 16 to move towards the front of the vehicle. With this contrivance, at the later stage of the secondary collision, the fastening bolt 16 comes off the open side end 13a of the tilt adjusting groove 13, thereby enabling the steering column 1 to be released from the car body. Accordingly, before the bending portion 11 of the car body sided upper bracket 4 reaches a limit of the flexure, the steering column 1 can be released from the car body, and a sufficient collapse stroke can be ensured.

Note that a width of the open end 13a of the tilt adjusting groove 13 under the protrusion (stopper) S is, as is well illustrated in FIG. 14B, larger than its width above the protrusion S. Namely, a recessed portion d is formed under the protrusion S. With this configuration, the protrusion (stopper) S can escape into the recessed portion d after being bent downwards, i.e., counterclockwise in the illustrative example.

Further, the absorbable impact load can be controlled by changing a dimension of the width of the protrusion (stopper) S substantially in the vertical direction.

Still further, the protrusion (stopper) S is provided on the rear-of-the-vehicle side of the tilt adjusting groove 13, and may also be provided on the front-of-the-vehicle side of this groove 13. The protrusions (stoppers) S may also be provided on both sides of the tilt adjusting groove 13.

Yet further, the protrusion (stopper) S may also be provided in a cut-away portion 5a in the car body sided lower bracket 3.

Next, an operation in the fifth embodiment will be explained.

When fastened in the tilt adjusting position, upon rotating the fastening lever 17, the first cam 18 and the second cam 19 make relative displacements, and the fastening bolt 16 is fastened in an axial direction. Then, an interval between the pair of face-to-face plate portions 11, 11 of the car body sided bracket 4 is narrowed down, and these plate portions 11, 11 are brought into the press-contact with both of wall surfaces of the distance bracket 15. The steering column 1 is thus fastened.

By contrast, when rotating the fastening lever 17 in the reversed direction, the first cam 18 and the second cam 19 make the relative displacements, thereby releasing the fastening bolt 16 from being fastened in the axial direction. The pair of face-to-face plate portions 11, 11 is thereby released from the press-contact with both of the wall surfaces of the distance bracket 15, with the result that the steering column 1 is released from being fastened and can be tilted at a desired tilt angle.

Next, upon the secondary collision, at the early stage thereof, as shown in FIG. 16, when the secondary impact load acts on the steering wheel 20 towards the front of the vehicle from the rear thereof, the steering column 1 tends to move towards the front of the vehicle together with the distance bracket 15 and the tilt fastening bolt 16.

Note that the tilt fastening bolt 16 moves, as illustrated in FIG. 16, down to the lowest position of the tilt adjusting groove 13, i.e., moves till it abuts on the protrusion (stopper) S.

Further, as shown in FIG. 16, the column sided lower bracket 6 and the tilt center bolt 7 separate from the car body sided lower bracket 3 in such a way that the tilt center bolt 7 is removed out of the cut-away portions 5a, 5b of the car body sided lower bracket 3, and move towards the front of the vehicle.

On this occasion, an impact load on the driver acts substantially horizontally towards the front of the vehicle from the rear thereof. On the other hand, the tilt fastening bolt 16 is disposed downwardly of the bending portion 11 substantially in the vertical direction, then starts moving in the horizontal direction with the bending portion 11 being made as a fulcrum substantially, and subsequently rotates around the bending portion 11 (fulcrum).

With this contrivance, as shown in FIG. 16, in the impact absorbing type steering column apparatus for the automotive vehicle according to the fifth embodiment, the vertical wall portion 12 and the column fastening/fixing portion 14 of the car body sided upper bracket 4 get collapsed while making their flexural deformations so as to rotate around the bending portion 11 (fulcrum), thereby absorbing the secondary impact energy.

Thus, according to the fifth embodiment, the bending portion 11 and the vertical wall portion 12 are disposed closer to the rear side of the vehicle than the car body fitting portion 10, while the column fastening/fixing portion 14 is disposed closer to the front side of the vehicle than the vertical wall portion 12. Owing to this layout, upon the secondary collision, the vertical wall portion 12 and the column fastening/fixing portion 14 of the car body sided upper bracket 4 start moving in the rotating direction around the bending portion 11 as the fulcrum, however, the moving direction is substantially horizontal and substantially coincident with an input direction (which is substantially horizontal) of the impact load from the driver. Accordingly, the starting movement of the car body sided upper bracket 4 can be stabilized when the secondary collision happens.

Moreover, according to the fifth embodiment, the grip portion 17b of the fastening lever 17 is disposed closer to the front side of the vehicle than the proximal end portion 17a thereof. Besides, upon the secondary collision, as shown in FIG. 4, the fastening lever 17 follows the collapsing motion of the car body sided bracket 4 and moves towards the front of the vehicle while rotating. It is therefore possible to further enhance the safety of the fastening lever 17 against striking on knees of the driver.

Next, at the later stage of the secondary collision, as shown in FIG. 17, the car body sided upper bracket 4 consecutively gets collapsed while making its flexural deformation so as to rotate around the bending portion 11 (fulcrum), thereby absorbing the secondary impact energy.

Simultaneously, the steering column 1 is so constructed as to be further movable beyond the tilt adjusting range as follows.

Namely, at the later stage of the secondary collision, the protrusion (stopper) S is bent or broken, etc. by the fastening bolt 16, thereby allowing the fastening bolt 16 to move towards the front of the vehicle. With this contrivance, at the later stage of the secondary collision, the fastening bolt 16 comes off the open end 13a of the tilt adjusting groove 13, thereby enabling the steering column 1 to be released from the car body. Accordingly, before the bending portion 11 of the car body sided upper bracket 4 reaches a limit of the flexure, the steering column 1 can be released from the car body, and a sufficient collapse stroke can be ensured.

Note that the early stage and the later stage of the secondary collision are within a series of continuous movements but do not imply separate operations. Further, in the fifth embodiment discussed above, the grease containing the extreme-pressure additive such as molybdenum disulfide, etc. may be applied to the tilt adjusting groove 13 and the bracket slide surface, whereby the fastening bolt 16 can slide on inside the tilt adjusting groove 13 more effectively.

Moreover, the grease containing the extreme-pressure additive such as molybdenum disulfide, etc. may be applied to between the column fastening/fixing portion 14 of the car body sided upper bracket 4 and the nut 39 or the second cam 19, and between the bolt fastening/fixing portion 14 and the distance bracket 15.

Modified Example of Fifth Embodiment

Figure 18:
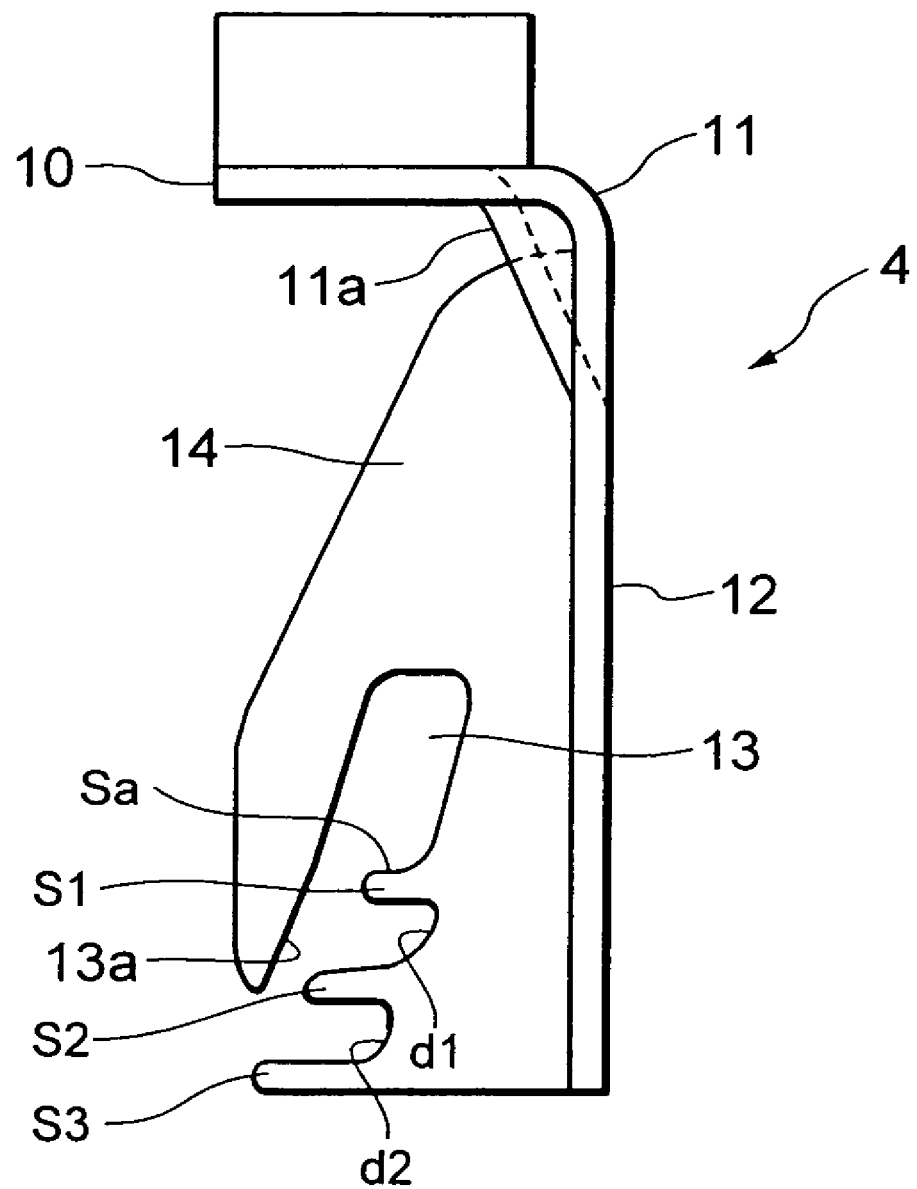
FIG. 18 is an enlarged side view of the car body sided upper bracket (tilt bracket) of the impact absorbing type steering column apparatus for the automotive vehicle according to a modified example of the fifth embodiment of the present invention.

FIG. 18 is an enlarged side view of the car body sided upper bracket (tilt bracket) of the impact absorbing type steering column apparatus according to a modified example of the fifth embodiment.

The protrusion (stopper) S provided in the tilt adjusting groove 13 may consist of plural pieces of protrusions. As shown in FIG. 18, for instance, three pieces of protrusions (stoppers) S1, S2, S3 are formed in the tilt adjusting groove 13 uniformly in alignment in their directions towards the front the car body. Note that the upper protrusion S1 has an abutting surface Sa on the side facing the fastening bolt 16, and this abutting surface Sa functions as a stopper for delimiting a lower side end position of the tilt adjusting range of the fastening bolt 16.

In this modified example, at the later stage of the secondary collision, the fastening bolt 16 collapses sequentially the three protrusions (stoppers) S1, S2, S3 and thereafter comes off the open end 13a of the tilt adjusting groove 13. In this process, the energy can be absorbed through not only the deformation of the car body sided upper bracket 4 itself but also the deformations of the protrusions (stoppers) S1, S2, S3.

It is to be noted that recessed portions d1, d2 are formed respectively under the protrusions (stoppers) S1, S2. With this configuration, the protrusions (stoppers) S1, S2 can escape into the recessed portions d1, d2 after being bent downwards, i.e., counterclockwise in the illustrative example.

Further, the absorbable impact load can be controlled by changing a dimension of the width of each of the protrusions (stoppers) S1, S2, S3 substantially in the vertical direction.

Still further, the protrusions (stoppers) S1, S2, S3 are provided on the rear-of-the-vehicle side of the tilt adjusting groove 13, and may also be provided on the front-of-the-vehicle side of this groove 13. The protrusions (stoppers) S1, S2, S3 may also be provided on both sides of the tilt adjusting groove 13.

Sixth Embodiment

Figure 19:
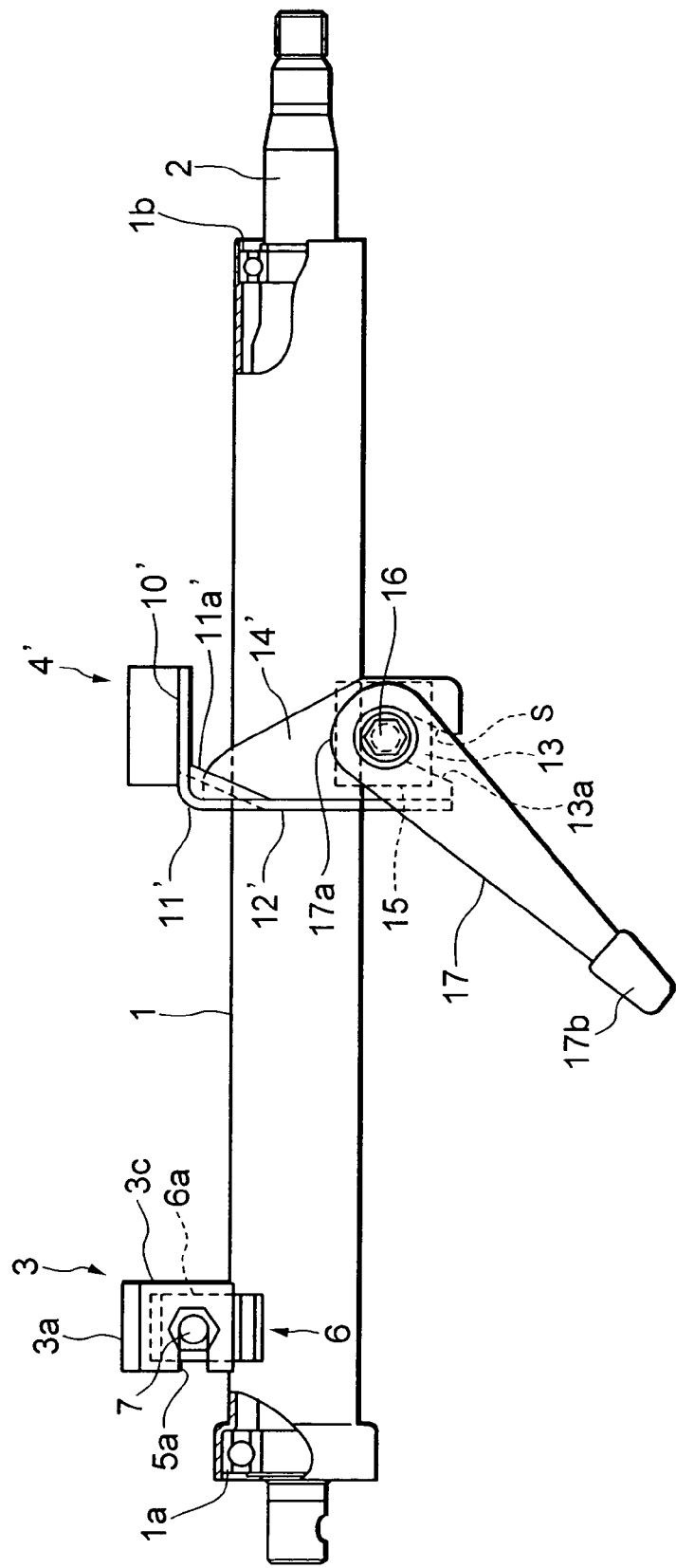
FIG. 19 is a side view of the impact absorbing type steering column apparatus for the automotive vehicle according to a sixth embodiment of the present invention.

FIG. 19 is a side view of the impact absorbing type steering column apparatus for the automotive vehicle according to a sixth embodiment of the present invention.

Figure 20:
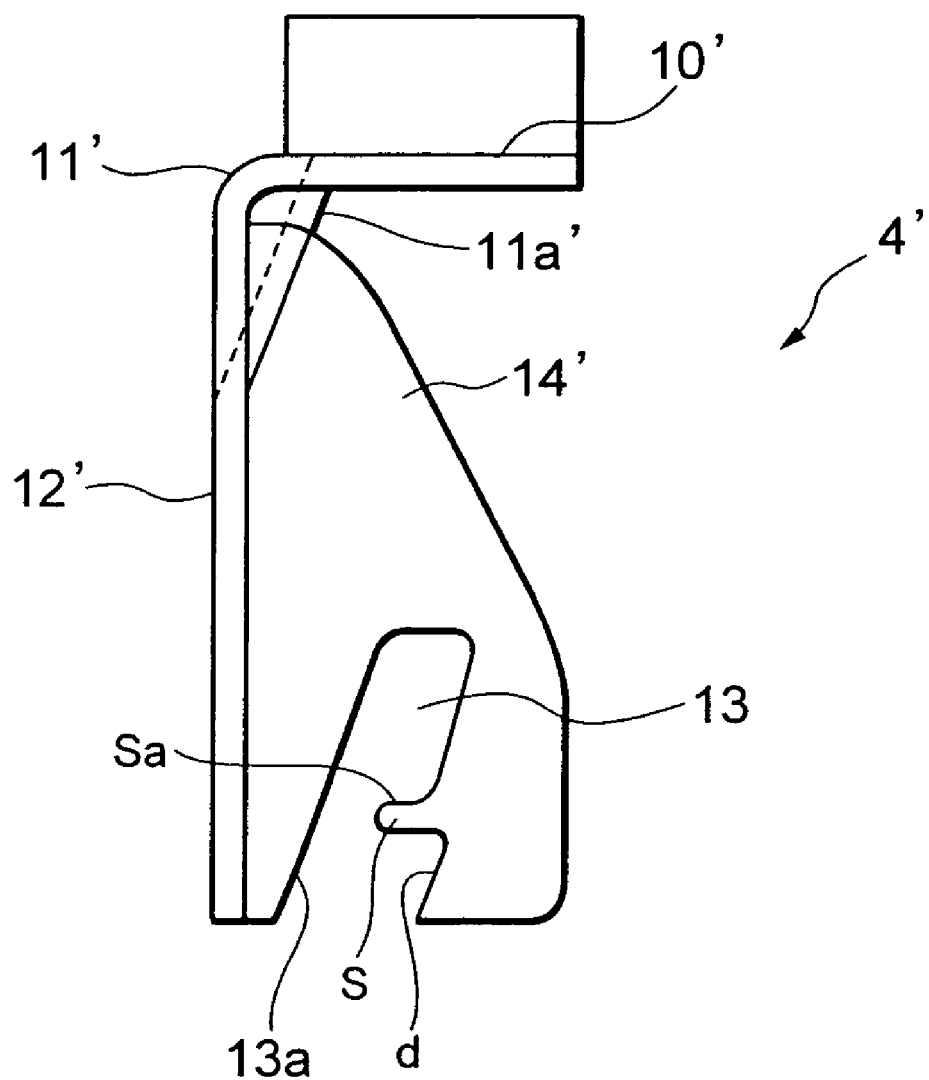
FIG. 20 is an enlarged side view of the car body sided upper bracket (tilt bracket) of the impact absorbing type steering column apparatus shown in FIG. 19.

FIG. 20 is an enlarged side view of the car body sided upper bracket (tilt bracket) of the impact absorbing type steering column apparatus shown in FIG. 19.

In the sixth embodiment, a bending portion 11' and vertical wall portion 12' are integrally formed in the front of a car body fitting portion 10' in a car body sided upper bracket (tilt bracket) 4'. Column fastening/fixing portion 14' is disposed closer to the rear of the vehicle than the vertical wall portion 12'. Furthermore, the bending portion 11' of the car body sided upper bracket 4' is formed with a reinforcing bead 11a'. A flexural load applied when the secondary collision happens can be adjusted by changing a size of the reinforcing bead 11a'.

Accordingly, in the sixth embodiment, the vertical wall portion 12' of the car body sided upper bracket 4' is disposed closer to the front side of the vehicle than the vertical wall portion 12 in the fifth embodiment described above. Other portions have the same configurations as in the fifth embodiment illustrated in FIG. 13, and the same portions are shown by marking them with the same numerals and symbols, and their explanations are omitted.

According to the sixth embodiment, the vertical wall portion 12' is provided closer to the front side of the vehicle than the vertical wall portion 12 in the fifth embodiment, and hence, when the secondary collision happens, the swing range of the steering column 1 can be enlarged, and the collapse stroke can be taken large.

Note that a width of the open end 13a of the tilt adjusting groove 13 under the protrusion (stopper) S is, as is well illustrated in FIG. 20, larger than its width above the protrusion S. Namely, a recessed portion d is formed under the protrusion S. With this configuration, the protrusion (stopper) S can escape into the recessed portion d after being bent downwards, i.e., counterclockwise in the illustrative example.

Further, the absorbable impact load can be controlled by changing a dimension of the width of the protrusion (stopper) S substantially in the vertical direction.

Still further, the protrusion (stopper) S is provided on the rear-of-the-vehicle side of the tilt adjusting groove 13, and may also be provided on the front-of-the-vehicle side of this groove 13. The protrusions (stoppers) S may also be provided on both sides of the tilt adjusting groove 13.

Seventh Embodiment

Figure 21A:
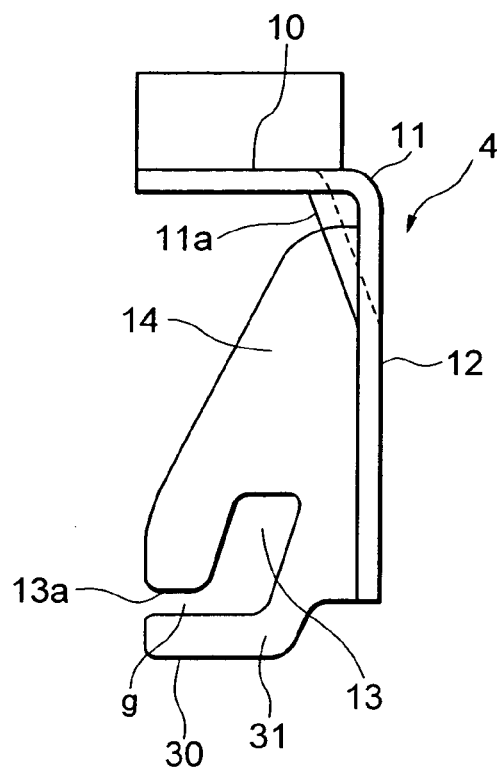
FIG. 21A is an enlarged side view of the car body sided upper bracket (tilt bracket) of the impact absorbing type steering column apparatus according to a seventh embodiment of the present invention.
Figure 21B:
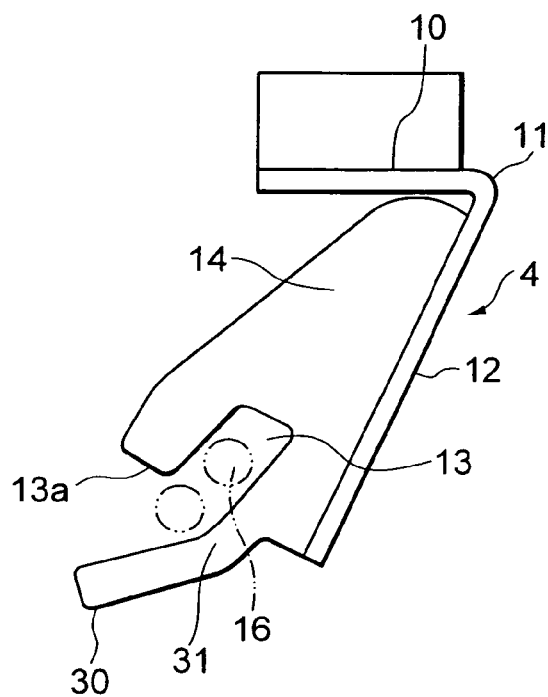
FIG. 21B is a view showing a behavior of the car body sided upper bracket illustrated in FIG. 21A when secondary collision happens.

FIG. 21A is an enlarged side view of the car body sided upper bracket (tilt bracket) of the impact absorbing type steering column apparatus according to a seventh embodiment of the present invention. FIG. 21B is a view showing a behavior of the car body sided upper bracket illustrated in FIG. 21A when secondary collision happens.

In the seventh embodiment, the car sided upper bracket 4 is formed with a restricting member 30 extending substantially towards the front of the vehicle so as to form a gap g between the open end 13a of the tilt adjusting groove 13 and the restricting member 30 itself. This restricting member 30 delimits substantially the lower end of the tilt adjusting range of the tilt adjusting groove 13.

Further, the gap g is set smaller than a diameter of the fastening bolt 16. Moreover, the restricting member 30 is formed with a bend allowing portion 31 for allowing the fastening bolt 16 to move towards the front of the vehicle via the open side end 13a (the gap g) when the secondary collision occurs. Namely, the bend allowing portion 31 is constructed to make its flexural deformation as shown in FIG. 21B when a predetermined load is applied thereto upon the secondary collision.

Note that the restricting member may extend towards the rear side of the vehicle from the front-of-the-vehicle side of the tilt adjusting groove 13.

Accordingly, at the early stage of the secondary collision, as shown in FIG. 21B, in the impact absorbing type steering column apparatus for the automotive vehicle according to the seventh embodiment, the vertical wall portion 12 and the column fastening/fixing portion 14 of the car body sided upper bracket 4 get collapsed while making their flexural deformations so as to rotate around the bending portion 11 (fulcrum), thereby absorbing the secondary impact energy.

Next, also at the later stage of the secondary collision, the car body sided upper bracket 4 consecutively gets collapsed while making its flexural deformation so as to rotate around the bending portion 11 (fulcrum), thereby absorbing the secondary impact energy.

Simultaneously, the steering column 1 is so constructed as to be further movable beyond the tilt adjusting range as follows.

To be specific, at this later stage of the secondary collision, the bend allowing portion 31 of the restricting member 30 is bent or broken by the fastening bolt 16, thus allowing the fastening bolt 16 to move towards the front of the vehicle.

With this contrivance, at the later stage of the secondary collision, the fastening bolt 16 comes off the open end 13a (the gap g) of the tilt adjusting groove 13, thereby enabling the steering column 1 to be released from the car body. Accordingly, before the bending portion 11 of the car body sided upper bracket 4 reaches a limit of the flexure, the steering column 1 can be released from the car body, and a sufficient collapse stroke can be ensured.

Eighth Embodiment

Figure 22A:
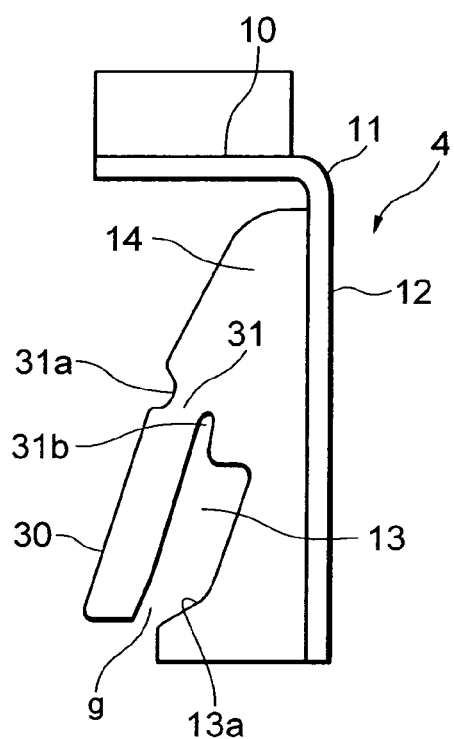
FIG. 22A is an enlarged side view of the car body sided upper bracket (tilt bracket) of the impact absorbing type steering column apparatus according to an eighth embodiment of the present invention.
Figure 22B:
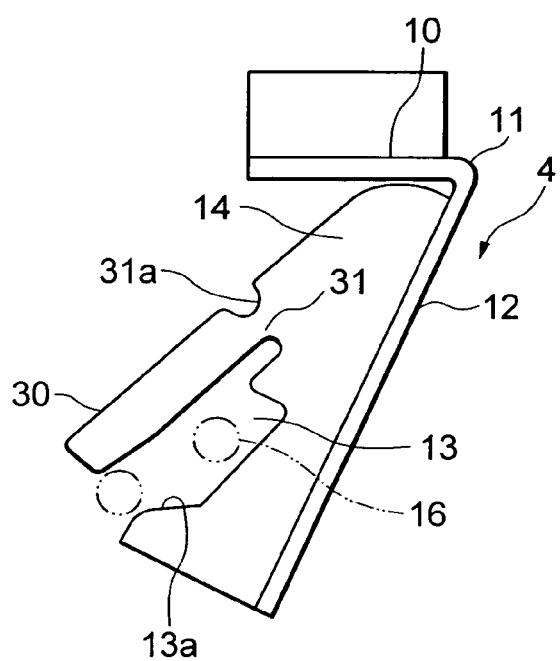
FIG. 22B is a view showing a behavior of the car body sided upper bracket illustrated in FIG. 22A when secondary collision happens.

FIG. 22A is an enlarged side view of the car body sided upper bracket (tilt bracket) of the impact absorbing type steering column apparatus according to an eighth embodiment of the present invention. FIG. 22B is a view showing a behavior of the car body sided upper bracket illustrated in FIG. 22A when secondary collision happens.

In the eighth embodiment, the car sided upper bracket 4 is formed with the restricting member 30 extending substantially in the vertical direction of the vehicle so as to form a gap g between an obliquely-formed open side end 13a of the tilt adjusting groove 13 and the restricting member 30 itself. This restricting member 30 cooperates with the obliquely-formed open end 13a to delimit substantially the end of the tilt adjusting range of the tilt adjusting groove 13.

Further, the gap g is set smaller than a diameter of the fastening bolt 16. Moreover, the restricting member 30 is formed with the bend allowing portion 31 for allowing the fastening bolt 16 to move towards the front of the vehicle via the open side end 13a (the gap g) when the secondary collision occurs. Namely, on both sides of this bend allowing portion 31, a circular-arc-recessed portion 31a is formed outwardly, while a groove-like recessed portion 31b is formed inwardly. A contrivance is that these recessed portions 31a, 31b help the bend allowing portion 31 make its flexural deformation as shown in FIG. 22B when a predetermined load is applied thereto upon the secondary collision.

Note that only any one of the recessed portions 31a, 31b may be formed.

Hence, at the early stage of the secondary collision, as shown in FIG. 22B, in the impact absorbing type steering column apparatus for the automotive vehicle according to the eighth embodiment, the vertical wall portion 12 and the column fastening/fixing portion 14 of the car body sided upper bracket 4 get collapsed while making their flexural deformations so as to rotate around the bending portion 11 (fulcrum), thereby absorbing the secondary impact energy.

Next, also at the later stage of the secondary collision, the car body sided upper bracket 4 consecutively gets collapsed while making its flexural deformation so as to rotate around the bending portion 11 (fulcrum), thereby absorbing the secondary impact energy.

Simultaneously, the steering column 1 is so constructed as to be further movable beyond the tilt adjusting range as follows.

To be specific, at this later stage of the secondary collision, the bend allowing portion 31 of the restricting member 30 is bent or broken by the fastening bolt 16, thus allowing the fastening bolt 16 to move towards the front of the vehicle.

With this contrivance, at the later stage of the secondary collision, the fastening bolt 16 comes off the open end 13a (the gap g) of the tilt adjusting groove 13, thereby enabling the steering column 1 to be released from the car body. Accordingly, before the bending portion 11 of the car body sided upper bracket 4 reaches a limit of the flexure, the steering column 1 can be released from the car body, and a sufficient collapse stroke can be ensured.

Ninth Embodiment

Figure 23:
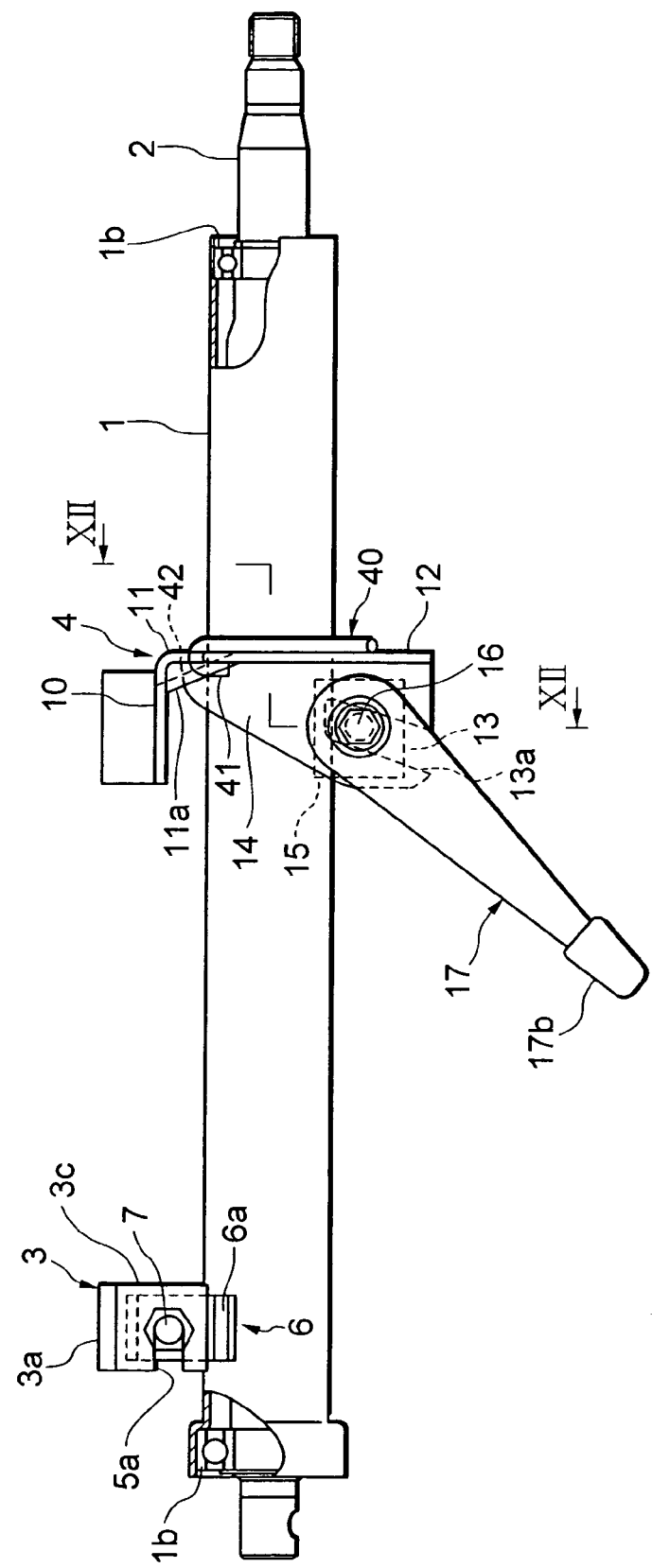
FIG. 23 is a side view of the impact absorbing type steering column apparatus for the automotive vehicle according to a ninth embodiment of the present invention.

FIG. 23 is a side view of the impact absorbing type steering column apparatus for the automotive vehicle according to a ninth embodiment of the present invention.

Figure 24:
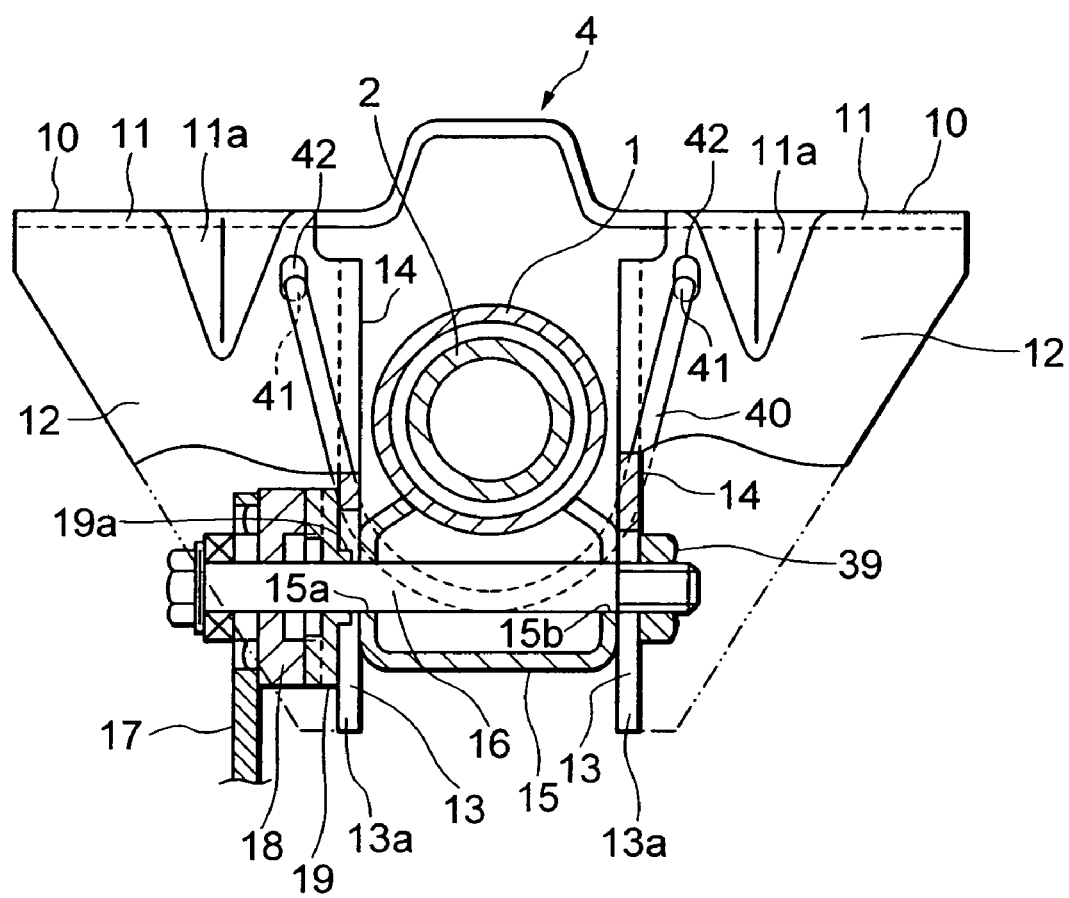
FIG. 24 is a sectional view taken along the line XII-XII in FIG. 23.

FIG. 24 is a sectional view taken along the line XII-XII in FIG. 23.

Provided in the ninth embodiment is a column support member 40 attached to the car body sided upper bracket 4 and extending so as to be bent substantially in a U-shape under the steering column 1.

The column support member 40 is constructed to roughly delimit substantially the lower end of the tilt adjusting range and to prevent the steering column 1 from coming off downwards upon the secondary collision.

Namely, the ninth embodiment does not adopt the protrusion (stopper) S in the tilt adjusting groove 13. The column support member 40 described above is provided as a substitute for this protrusion S.

The column support member 40 is a U-shaped wire and includes a pair of hook portions 41 of which front side ends are bent. The pair of hook portions 41 are secured into (engaged with) two pieces of securing holes 42 formed in the vertical wall portion 12 of the car body sided upper bracket 4.

A U-shaped surface of the column support member, which faces the undersurface of the steering column 1, works to determine a lower limit position of the tilt adjustment when moving the steering column 1 downwards for the tilt operation.

From what has been discussed so far, at the early stage of the secondary collision, in the impact absorbing type steering column apparatus for the automotive vehicle according to the ninth embodiment, the vertical wall portions 12 and the column fastening/fixing portions 14 of the car body sided upper bracket 4 get collapsed while making their flexural deformations so as to rotate around the bending portions 11 (fulcrum), thereby absorbing the secondary impact energy.

Next, at the later stage of the secondary collision, the open ends 13*a* of the tilt adjusting grooves 13 are directed to the front of the vehicle, and hence the fastening bolt 16 further moves beyond the tilt adjusting range and comes off the open ends 13*a*, thereby enabling the steering column 1 to be released from the car body.

Simultaneously, the column support wire member 40 prevents the steering column 1 from falling down.

To be specific, the fastening bolt 16 within the tilt adjusting groove 13 moves, and the lower portion of the steering column 1 abuts on the U-shaped surface of the column support member 40. The undersurface of the steering column 1 is sustained on the U-shaped surface of the column support wire member 40, in which state the steering column 1 continues to move forwards. Namely, the steering column 1 continues to move forwards a long distance while ensuring a collapsing trajectory without falling down. As a result, the collapse stroke can be further extended.

Accordingly, before the bending portion 11 of the car body sided upper bracket 4 reaches a limit of the flexure, the steering column 1 can be released from the car body, and a sufficient collapse stroke can be ensured. Moreover, the steering column 1 can move a long distance without falling down, and therefore the collapse stroke can be further extended.

The various modifications may be made in a variety of forms without being limited to the fifth through ninth embodiments discussed above.

For instance, a construction may be adopted, wherein the cut-away portion of the car body sided lower bracket (or the column sided lower bracket) is provided with a protrusion, thereby absorbing the impact load.

Further, for example, in the fifth through ninth embodiments discussed above, without being limited to the upper and lower side brackets, the vertical wall portion may be disposed in front or in rear of the car body fitting portion, and the column fastening/fixing portion may be disposed in front or in rear of the vertical wall portion. Moreover, the hinge fixing portion may be disposed in front or in rear of the vertical wall portion.

Still further, the embodiments discussed above may be carried out singly or in combination.

Note that the discussion on each of the embodiments has been focused on the steering column apparatus incorporating the tilt mechanism, however, the present invention can be applied to steering column apparatuses having none of the tilt mechanisms. Moreover, the steering column apparatus of which the interior has no means of absorbing the energy has been described, however, according to the present invention, the energy absorbing means may be provided within the steering column apparatus.

Furthermore, according to other embodiments, as in the fifth embodiment, the grease containing the extreme-pressure additive such as molybdenum disulfide, etc. may be applied to between the tilt groove 13, the column fastening/fixing portion 14 of the car body sided upper bracket 4 and the nut 39 or the second cam 19, and between the bolt fastening/fixing portion 14 and the distance bracket 15.

What is claimed is:

1. An impact absorbing type steering column apparatus for an automotive vehicle, capable of adjusting a steering position and, when a secondary collision happens, absorbing impact energy thereof by moving a steering column supported through a bracket on a vehicle body towards the front of the vehicle, characterized in that said bracket includes a vehicle body mounting portion to be fixed to a vehicle body, a vertical wall portion bent substantially in an L-shape from the vehicle body mounting portion through a bending portion, a column fastening/fixing portion extending from the vertical wall portion, and a groove for adjusting a tilt position of the steering column, through which groove a fastening bolt is inserted so that when the fastening bolt is fastened the steering column is fastened and fixed by the column fastening/fixing portion, and when the fastening bolt is unfastened the steering column is released from the column fastening/fixing portion in order to become position adjustable, said groove being formed with a restricting portion for restricting position adjusting movement of the steering column movement within a normal adjustment range, and said groove being extended beyond said restricting portion and being opened at an end, whereby when a secondary collision occurs, movement of said fastening bolt together with the steering column is restricted by said restricting portion so that the bracket is bent at the bending portion to absorb impact energy and, thereafter, said fastening bolt together with the steering column move beyond said restricting portion and are released from the bracket.

2. An impact absorbing type steering column apparatus for an automotive vehicle according to claim 1, wherein a lower bracket supporting said steering column through a hinge mechanism in the front of the vehicle and supported on the vehicle body, is provided on a front-of-the-vehicle side of said bracket, said lower bracket includes a cutaway portion through which a pivot of said hinge mechanism is inserted and of which a front of the vehicle side is opened, and said pivot comes off said open end of said cut-away portion upon an axis directional movement of said steering column when the secondary collision happens, and said steering column is released from said lower bracket.

3. An impact absorbing type steering column apparatus for an automotive vehicle according to claim 2, wherein said restricting portion extends substantially in vertical directions in a way that leaves said open end, and is formed to delimit substantially an end position, within said adjusting groove, of said steering position adjusting range, and said restricting portion includes a bend allowing portion for allowing said fastening member of said steering column to move towards the front of the vehicle through said open end.

4. An impact absorbing type steering column apparatus for an automotive vehicle according to claim 2, wherein a protrusion for regulating a movement of said fastening member is provided at said restricting portion within said adjusting groove.

5. An impact absorbing type steering column apparatus for an automotive vehicle according to claim 2, further comprising a column support member extending so as to be curved under said steering column, wherein said column support member delimits substantially the lower portion of the steering position adjusting range, and prevents said steering column from falling down.

6. An impact absorbing type steering column apparatus for an automotive vehicle according to claim 1, wherein a protrusion for regulating a movement of said fastening member is provided at said restricting portion within said adjusting groove.

7. An impact absorbing type steering column apparatus for an automotive vehicle according to claim 6, wherein at least one additional protrusion is disposed in said adjusting groove beyond said restricting portion, so as to provide a plurality of protrusions formed in alignment in their directions towards the front of the vehicle.

8. An impact absorbing type steering column apparatus for an automotive vehicle according to claim 7, wherein said protrusion includes an abutting surface on the side facing said fastening member.

9. An impact absorbing type steering column apparatus for an automotive vehicle according to claim 6, wherein said protrusion includes an abutting surface on the side facing said fastening member.

10. An impact absorbing type steering column apparatus for an automotive vehicle according to claim 1, wherein said restricting portion of said bracket extends substantially in front-and-rear directions of the vehicle in a way that leaves said open end, and is formed to delimit substantially a lower portion of said position adjusting groove, and said restricting portion includes a bend allowing portion for allowing said fastening member of said steering column to move towards the front of the vehicle through said open end.

11. An impact absorbing type steering column apparatus for an automotive vehicle according to claim 1, further comprising a column support member extending so as to be curved under said steering column, wherein said column support member delimits substantially the lower portion of the steering position adjusting range, and prevents said steering column from falling down.

12. An impact absorbing type steering column apparatus for an automotive vehicle, capable of adjusting a steering position and, when a secondary collision happens, absorbing impact energy thereof by moving a steering column supported through a bracket arrangement on a vehicle body towards the front of the vehicle, characterized in that there is provided a restricting member including a first restricting portion and a second restricting portion, said restricting member allows, within said first restricting portion, said steering column to move for a positional adjustment, then deforms when said steering column moves, upon a secondary collision, beyond a first predetermined range restricted by said first restricting portion, and restricts the movement of said steering column within a second predetermined range by use of said second restricting portion.

13. An impact absorbing type steering column apparatus for an automotive vehicle according to claim 12, wherein said bracket arrangement is constructed of an upper bracket and a lower bracket, a bolt is inserted through a hole of said upper bracket, and said steering column is supported by said upper bracket, said restricting member is formed integrally with said vehicle body sided upper bracket, said first restricting portion is formed with said hole, and when said steering column moves through only the first predetermined range upon the secondary collision, said bolt causes said restricting member to deform and enters said second restricting portion provided adjacent to said first restricting portion.

14. An impact absorbing type steering column apparatus for an automotive vehicle according to claim 13, wherein when said bolt enters said second restricting portion, said restricting member makes its flexural deformation so as to extend in a moving direction of said bolt.

15. An impact absorbing type steering column apparatus for an automotive vehicle according to claim 13, wherein said second restricting portion is previously formed as an elongate hole suitable for guiding said bolt in its moving direction when said bolt has entered said second restricting portion.

16. An impact absorbing type steering column apparatus for an automotive vehicle according to claim 13, wherein said hole of said upper bracket is a groove for a tilt adjustment, said bolt is a fastening bolt for the tilt adjustment, and said lower bracket pivotally supports said steering column.

17. An impact absorbing type steering column apparatus for an automotive vehicle according to claim 12, wherein said bracket arrangement is constructed of an upper bracket and a lower bracket, a bolt is inserted through a hole of said lower bracket, and said steering column is supported by said lower bracket, said restricting member is formed integrally with said vehicle body sided lower bracket, said first restricting portion is formed with said hole, and when the secondary collision happens, impact energy is absorbed in a way that causes a flexural deformation of said restricting member while moving said steering column towards the front of the vehicle, and when said steering column moves through only the first predetermined range, said bolt causes said restricting member to deform and enters said second restricting portion provided adjacent to said first restricting portion.

18. An impact absorbing type steering column apparatus for an automotive vehicle according to claim 17, wherein when said bolt enters said second restricting portion, said restricting member makes its flexural deformation so as to extend in a moving direction of said bolt.

19. An impact absorbing type steering column apparatus for an automotive vehicle according to claim 17, wherein said second restricting portion is previously formed as an elongate hole suitable for guiding said bolt in its moving direction when said bolt has entered said second restricting portion.

20. An impact absorbing type steering column apparatus for an automotive vehicle according to claim 17, wherein said hole of said vehicle body sided lower bracket is a support hole for the tilt adjustment, and said bolt is a tilt adjusting hinge pin for determining a tilt center when inserted into said support hole.

* * * * *